US 12,472,837 B2

(12) United States Patent
Silorio et al.

(10) Patent No.: US 12,472,837 B2
(45) Date of Patent: Nov. 18, 2025

(54) ELECTRIC VEHICLE CHARGING MASTER CONTROLLER

(71) Applicant: CyberSwitchingPatents, LLC, San Jose, CA (US)

(72) Inventors: Ron Silorio, Pittsburg, CA (US); Charles Henry Reynolds, Morgan Hill, CA (US)

(73) Assignee: CyberSwitchingPatents, LLC, San Jose, CA (US)

( * ) Notice: Subject to any disclaimer, the term of this patent is extended or adjusted under 35 U.S.C. 154(b) by 714 days.

(21) Appl. No.: 17/676,353

(22) Filed: Feb. 21, 2022

(65) Prior Publication Data

US 2023/0264591 A1    Aug. 24, 2023

(51) Int. Cl.
*B60L 53/63* (2019.01)
*B60L 53/30* (2019.01)
*B60L 53/62* (2019.01)

(52) U.S. Cl.
CPC ........... *B60L 53/63* (2019.02); *B60L 53/305* (2019.02); *B60L 53/62* (2019.02)

(58) Field of Classification Search
CPC ......... B60L 53/62; B60L 53/63; B60L 53/305
USPC ....................................................... 320/109
See application file for complete search history.

(56) References Cited

U.S. PATENT DOCUMENTS

| | | | | |
|---|---|---|---|---|
| 4,960,389 A * | 10/1990 | Frantz | ............... | H01R 43/01 439/474 |
| 5,099,186 A * | 3/1992 | Rippel | ............... | B60L 3/003 318/803 |
| 5,317,691 A * | 5/1994 | Traeger | ............... | B60R 11/0241 710/72 |
| 5,518,424 A * | 5/1996 | Douty | ............... | H01M 50/213 439/500 |
| 5,548,200 A * | 8/1996 | Nor | ............... | B60L 53/11 320/132 |
| 5,978,569 A * | 11/1999 | Traeger | ............... | B60R 11/02 710/64 |
| 6,885,920 B2 * | 4/2005 | Yakes | ............... | B60L 50/61 180/65.245 |
| 6,963,186 B2 * | 11/2005 | Hobbs | ............... | B60L 53/14 320/128 |
| 7,550,870 B2 | 6/2009 | Reynolds et al. | | |

(Continued)

*Primary Examiner* — Drew A Dunn
*Assistant Examiner* — Frank Alexis Silva
(74) *Attorney, Agent, or Firm* — Microelectronic Devices IP LLC; Shawn T. Walsh

(57) ABSTRACT

An electric vehicle charging master controller includes an instruction processing unit, a user interface module, and a charging interface module. Electric vehicle (EV) charging equipment is external to the controller. The instruction processing unit is configured to execute instructions for charging electric vehicles (EVs). The charging interface module is configured to receive information from the instruction processing unit and transmit information to the EV charging equipment. The instruction processing unit is configured to transmit information to the charging interface module, which is designed to cause the EV charging equipment to direct charging current to the plurality of EVs, one at a time. The instruction processing unit is also configured to transmit information to the charging interface module designed to cause the EV charging equipment to stop the charging current to each EV when a charging cessation criterion has been met.

20 Claims, 15 Drawing Sheets

(56) References Cited

U.S. PATENT DOCUMENTS

| | | | |
|---|---|---|---|
| 7,630,186 B2 | 12/2009 | Reynolds et al. | |
| 7,791,319 B2* | 9/2010 | Veselic | H02J 7/0071 |
| | | | 320/132 |
| 8,013,570 B2* | 9/2011 | Baxter | B60L 53/64 |
| | | | 320/108 |
| 8,294,420 B2* | 10/2012 | Kocher | B60L 53/64 |
| | | | 320/124 |
| 8,324,859 B2* | 12/2012 | Rossi | B60L 53/63 |
| | | | 307/18 |
| 8,432,126 B2* | 4/2013 | Hasan | B60L 53/24 |
| | | | 320/104 |
| 8,531,162 B2* | 9/2013 | Hafner | B60L 53/305 |
| | | | 705/72 |
| 8,686,687 B2* | 4/2014 | Rossi | H02J 13/00034 |
| | | | 307/18 |
| 8,717,170 B1* | 5/2014 | Juhasz | B60L 53/63 |
| | | | 340/5.2 |
| 8,860,362 B2* | 10/2014 | Kamen | B60L 53/00 |
| | | | 320/109 |
| 8,891,252 B2* | 11/2014 | Sweet | H02M 1/36 |
| | | | 363/16 |
| 8,981,718 B2* | 3/2015 | Caffy | B60L 53/67 |
| | | | 320/124 |
| 9,048,050 B2* | 6/2015 | Kurita | H01K 47/02 |
| 9,290,104 B2* | 3/2016 | Gadh | B60L 53/66 |
| 9,321,361 B2* | 4/2016 | Kamen | B60L 8/003 |
| 9,346,365 B1* | 5/2016 | Penilla | B60L 53/14 |
| 9,348,381 B2* | 5/2016 | Khoo | B60L 53/14 |
| 9,403,441 B2* | 8/2016 | Ashworth | B60L 53/63 |
| 9,429,974 B2* | 8/2016 | Forbes, Jr. | H02J 13/00001 |
| 9,434,270 B1* | 9/2016 | Penilla | G06Q 10/20 |
| 9,469,211 B2* | 10/2016 | Baxter | B60L 53/64 |
| 9,469,262 B2* | 10/2016 | Ido | B60R 16/033 |
| 9,505,318 B2* | 11/2016 | Hendrix | B60L 58/12 |
| 9,563,215 B2* | 2/2017 | Forbes, Jr. | H02J 13/00028 |
| 9,573,478 B2* | 2/2017 | Jefferies | B60L 53/66 |
| 9,620,970 B2* | 4/2017 | Gadh | H02J 13/00028 |
| 9,718,370 B2* | 8/2017 | Penilla | B60L 53/305 |
| 9,802,500 B1* | 10/2017 | Penilla | H04W 4/02 |
| 9,805,890 B2* | 10/2017 | Doljack | H01H 35/00 |
| 9,871,410 B2* | 1/2018 | Lee | H02J 9/061 |
| 9,908,421 B2* | 3/2018 | Koolen | B60L 55/00 |
| 9,908,427 B2* | 3/2018 | Baxter | B60L 53/665 |
| 10,071,643 B2* | 9/2018 | Penilla | G06Q 30/0645 |
| 10,168,722 B2* | 1/2019 | Forbes, Jr. | G05B 15/02 |
| 10,173,544 B2* | 1/2019 | Hendrix | B60L 53/305 |
| 10,252,633 B2* | 4/2019 | Baxter | H02J 7/0013 |
| 10,429,871 B2* | 10/2019 | Forbes, Jr. | H02J 13/00028 |
| 10,471,846 B2* | 11/2019 | Chan | H02J 3/322 |
| 10,500,976 B2* | 12/2019 | Jang | B60L 53/31 |
| 10,556,513 B2* | 2/2020 | Kamen | B60L 53/305 |
| 10,586,258 B2* | 3/2020 | Khoo | B60L 53/14 |
| 10,661,659 B2 | 5/2020 | Silorio et al. | |
| 10,682,925 B2* | 6/2020 | Chan | B60L 53/63 |
| 10,768,654 B2* | 9/2020 | Forbes, Jr. | H02J 3/322 |
| 10,770,918 B2* | 9/2020 | Alouani | H02J 3/00 |
| 10,807,485 B2* | 10/2020 | Koolen | B60L 53/62 |
| 10,836,273 B2* | 11/2020 | Zhu | B60L 53/20 |
| 10,836,275 B2* | 11/2020 | Zhu | B60L 53/62 |
| 10,843,581 B2 | 11/2020 | Reynolds et al. | |
| 10,850,627 B2 | 12/2020 | Reynolds et al. | |
| 10,861,066 B2* | 12/2020 | Khoo | B60L 53/68 |
| 10,872,361 B2* | 12/2020 | Khoo | H04W 4/40 |
| 10,913,372 B2* | 2/2021 | Baxter | H02J 7/0013 |
| 11,007,885 B2* | 5/2021 | Koolen | B60L 55/00 |
| 11,104,241 B2* | 8/2021 | Chan | G06Q 50/40 |
| 11,104,246 B2 | 8/2021 | Reynolds et al. | |
| 11,110,814 B2* | 9/2021 | Straßer | B60L 53/14 |
| 11,126,213 B2* | 9/2021 | Forbes, Jr. | H02J 13/00 |
| 11,155,174 B2* | 10/2021 | Silorio | B60L 53/14 |
| 11,171,509 B2* | 11/2021 | Lee | B60L 53/305 |
| 11,180,034 B2 | 11/2021 | Reynolds et al. | |
| 11,225,163 B2* | 1/2022 | Yaldo | B60L 53/67 |
| 11,267,358 B2* | 3/2022 | Smolenaers | H02J 7/02 |
| 11,372,044 B2* | 6/2022 | Lee | B60L 53/11 |
| 11,554,683 B2* | 1/2023 | Cashdollar | H02J 7/0013 |
| 11,568,159 B2* | 1/2023 | Kovarik | E01F 9/30 |
| 11,590,851 B2* | 2/2023 | Reynolds | B60L 53/63 |
| 11,625,058 B2* | 4/2023 | Forbes, Jr. | H02J 9/061 |
| | | | 700/295 |
| 11,626,751 B2* | 4/2023 | Alouani | G05B 19/048 |
| | | | 700/295 |
| 11,660,972 B2* | 5/2023 | Kamen | B60L 53/65 |
| | | | 320/104 |
| 11,715,136 B2* | 8/2023 | Khoo | B60L 53/63 |
| | | | 700/286 |
| 11,760,215 B2* | 9/2023 | Silorio | B60L 53/65 |
| | | | 320/104 |
| 11,766,948 B1* | 9/2023 | Abrams | B60L 58/12 |
| | | | 320/109 |
| 11,780,345 B2* | 10/2023 | Baxter | B60L 3/0084 |
| | | | 320/109 |
| 11,782,470 B2* | 10/2023 | Forbes, Jr. | H02J 13/00001 |
| | | | 700/286 |
| 11,858,369 B2* | 1/2024 | Books | B60L 53/53 |
| 11,868,927 B2* | 1/2024 | Erikson | B60L 53/67 |
| 11,938,831 B2* | 3/2024 | Silorio | B60L 53/665 |
| 12,054,070 B2* | 8/2024 | Reynolds | B60L 53/68 |
| 12,061,491 B2* | 8/2024 | Forbes, Jr. | G05B 15/02 |
| 12,065,046 B2* | 8/2024 | Reynolds | B60L 53/62 |
| 12,077,058 B1* | 9/2024 | Fietzek | B60L 53/305 |
| 12,083,920 B2* | 9/2024 | Mannepalli | B60L 53/63 |
| 12,175,506 B2* | 12/2024 | Khoo | G06Q 10/1093 |
| 12,181,904 B2* | 12/2024 | Forbes, Jr. | G05F 1/66 |
| 12,420,650 B2* | 9/2025 | Ogawa | B60L 50/50 |
| 2002/0057205 A1* | 5/2002 | Reynolds | G06F 1/266 |
| | | | 340/693.1 |
| 2002/0057206 A1* | 5/2002 | Reynolds | G06F 1/266 |
| | | | 340/3.1 |
| 2003/0158638 A1* | 8/2003 | Yakes | G07C 5/008 |
| | | | 180/65.245 |
| 2004/0047095 A1 | 3/2004 | Reynolds et al. | |
| 2004/0169489 A1* | 9/2004 | Hobbs | H02J 7/007182 |
| | | | 320/104 |
| 2008/0012427 A1* | 1/2008 | Wilson | H02J 7/342 |
| | | | 307/66 |
| 2009/0021213 A1* | 1/2009 | Johnson | B60L 53/665 |
| | | | 320/109 |
| 2009/0313098 A1* | 12/2009 | Hafner | B60L 53/68 |
| | | | 705/14.1 |
| 2010/0007311 A1* | 1/2010 | Colin | H01M 10/482 |
| | | | 320/134 |
| 2010/0134067 A1* | 6/2010 | Baxter | B60L 3/0084 |
| | | | 320/109 |
| 2010/0214109 A1 | 8/2010 | Reynolds et al. | |
| 2010/0219797 A1* | 9/2010 | Veselic | H02J 7/0071 |
| | | | 320/162 |
| 2011/0001356 A1* | 1/2011 | Pollack | H02J 7/00 |
| | | | 307/31 |
| 2011/0025267 A1* | 2/2011 | Kamen | B60L 53/665 |
| | | | 320/109 |
| 2011/0074350 A1* | 3/2011 | Kocher | B60L 53/63 |
| | | | 320/109 |
| 2011/0109266 A1* | 5/2011 | Rossi | B60L 53/63 |
| | | | 307/18 |
| 2011/0202418 A1* | 8/2011 | Kempton | B60L 53/63 |
| | | | 705/26.1 |
| 2011/0215743 A1* | 9/2011 | Fukatsu | B60L 53/14 |
| | | | 318/139 |
| 2012/0044843 A1* | 2/2012 | Levy | H02J 13/00002 |
| | | | 370/310 |
| 2012/0049793 A1* | 3/2012 | Ross | H01M 10/44 |
| | | | 320/109 |
| 2012/0062176 A1* | 3/2012 | Hasan | B60L 50/16 |
| | | | 320/109 |
| 2012/0146582 A1* | 6/2012 | Lei | B60L 53/305 |
| | | | 320/109 |
| 2012/0314462 A1* | 12/2012 | Sweet | H02J 5/00 |
| | | | 363/49 |

(56) References Cited

U.S. PATENT DOCUMENTS

| | | | |
|---|---|---|---|
| 2012/0330494 A1* | 12/2012 | Hendrix | B60L 53/66 701/29.3 |
| 2013/0049689 A1* | 2/2013 | Hayashigawa | B60L 53/11 320/109 |
| 2013/0066494 A1* | 3/2013 | Kamijo | F02N 11/0844 180/65.265 |
| 2013/0110296 A1* | 5/2013 | Khoo | G06Q 20/409 700/286 |
| 2013/0141040 A1* | 6/2013 | DeBoer | B60L 53/62 320/109 |
| 2013/0147404 A1* | 6/2013 | Kim | B60L 7/14 318/139 |
| 2013/0154561 A1* | 6/2013 | Gadh | H02J 7/0019 320/109 |
| 2013/0187602 A1* | 7/2013 | Bouman | B60L 53/20 320/109 |
| 2013/0207455 A1* | 8/2013 | Doljack | H02J 9/005 307/130 |
| 2013/0214737 A1* | 8/2013 | Wu | B60L 53/66 320/109 |
| 2013/0214738 A1* | 8/2013 | Chen | B60L 58/13 320/109 |
| 2013/0219084 A1* | 8/2013 | Wu | G06F 3/00 710/11 |
| 2013/0265005 A1* | 10/2013 | Kurita | B60L 15/007 320/109 |
| 2013/0278225 A1* | 10/2013 | Dietze | B60L 53/65 320/137 |
| 2013/0307466 A1* | 11/2013 | Frisch | H02J 3/322 320/106 |
| 2013/0314037 A1* | 11/2013 | Caffy | H02J 7/0071 320/109 |
| 2013/0334879 A1* | 12/2013 | Ido | B60R 16/033 307/10.1 |
| 2013/0346010 A1* | 12/2013 | Schulz | B60L 53/14 324/602 |
| 2013/0346025 A1* | 12/2013 | Schulz | B60L 53/60 702/182 |
| 2014/0018969 A1* | 1/2014 | Forbes, Jr. | H02J 13/00001 700/295 |
| 2014/0058575 A1* | 2/2014 | Ashworth | B60L 53/63 700/297 |
| 2014/0062401 A1* | 3/2014 | Gadh | B60L 53/67 320/109 |
| 2014/0111165 A9* | 4/2014 | Dietze | B60L 53/64 320/137 |
| 2014/0117946 A1* | 5/2014 | Muller | B60L 53/64 320/162 |
| 2014/0203077 A1* | 7/2014 | Gadh | B60L 53/30 235/382 |
| 2014/0266004 A1* | 9/2014 | Andrews, Jr. | B60L 58/12 320/108 |
| 2014/0266046 A1* | 9/2014 | Baxter | B60L 53/63 320/109 |
| 2014/0354227 A1* | 12/2014 | Tyagi | B60L 53/63 320/109 |
| 2015/0066279 A1* | 3/2015 | Kamen | B60L 58/12 701/22 |
| 2015/0069936 A1* | 3/2015 | Jang | B60L 58/21 318/139 |
| 2015/0100172 A1* | 4/2015 | Forbes, Jr. | H04L 67/10 700/295 |
| 2015/0123613 A1* | 5/2015 | Koolen | B60L 53/67 320/109 |
| 2015/0137752 A1* | 5/2015 | Shinzaki | H02J 7/0048 320/132 |
| 2015/0175026 A1* | 6/2015 | Uyeki | B60L 53/18 320/109 |
| 2015/0231978 A1* | 8/2015 | Danner | H02J 7/00 307/10.1 |
| 2015/0298565 A1* | 10/2015 | Iwamura | G06Q 10/04 701/22 |
| 2015/0298574 A1* | 10/2015 | Bramson | B60L 15/2045 701/22 |
| 2015/0314694 A1* | 11/2015 | Alakula | B60L 53/14 320/109 |
| 2016/0107530 A1* | 4/2016 | Roberts | H01R 13/6683 320/109 |
| 2016/0137082 A1* | 5/2016 | Jefferies | B60L 53/16 320/109 |
| 2016/0190961 A1* | 6/2016 | Holveck | H02P 6/181 318/400.09 |
| 2016/0236583 A1* | 8/2016 | Kamen | B60L 53/665 |
| 2016/0285306 A1* | 9/2016 | Lee | H02J 9/061 |
| 2016/0318503 A1* | 11/2016 | Zhou | B60L 58/18 |
| 2016/0334824 A1* | 11/2016 | Forbes, Jr. | H02J 13/00001 |
| 2016/0339792 A1* | 11/2016 | Khoo | B60L 53/67 |
| 2016/0362016 A1* | 12/2016 | Khoo | G06Q 50/40 |
| 2016/0364658 A1* | 12/2016 | Khoo | B60L 53/31 |
| 2016/0375780 A1* | 12/2016 | Penilla | G06Q 50/06 320/109 |
| 2016/0380440 A1* | 12/2016 | Coleman, Jr. | H02J 7/0013 700/295 |
| 2017/0017213 A1* | 1/2017 | Miftakhov | H02J 7/0013 |
| 2017/0101022 A1* | 4/2017 | Morgan | B60L 53/66 |
| 2017/0106764 A1* | 4/2017 | Beaston | B60L 58/12 |
| 2017/0126033 A1* | 5/2017 | Dudar | B60K 6/40 |
| 2017/0147026 A1* | 5/2017 | Forbes, Jr. | H02J 13/00028 |
| 2017/0158067 A1* | 6/2017 | Reynolds | B60L 53/63 |
| 2017/0158071 A1* | 6/2017 | Reynolds | B60L 53/665 |
| 2017/0158075 A1* | 6/2017 | Reynolds | B60L 53/305 |
| 2017/0250550 A1* | 8/2017 | Miftakhov | H02J 3/007 |
| 2017/0320398 A1* | 11/2017 | Penilla | G06Q 30/0643 |
| 2017/0351587 A1* | 12/2017 | Halker | H02J 7/00034 |
| 2018/0037125 A1* | 2/2018 | Penilla | B60L 58/21 |
| 2018/0065496 A1* | 3/2018 | Reynolds | H02J 7/0013 |
| 2018/0111493 A1* | 4/2018 | Chan | G01R 19/10 |
| 2018/0141447 A1* | 5/2018 | Koolen | B60L 53/31 |
| 2018/0162358 A1* | 6/2018 | Youn | B60L 50/16 |
| 2018/0229617 A1* | 8/2018 | Hendrix | B60L 53/60 |
| 2018/0304759 A1* | 10/2018 | Chase | B60L 53/68 |
| 2018/0339601 A1* | 11/2018 | Kruszelnicki | B60L 53/16 |
| 2018/0370372 A1* | 12/2018 | Silorio | G05B 19/042 |
| 2019/0001833 A1* | 1/2019 | Coburn | B60L 53/66 |
| 2019/0027961 A1* | 1/2019 | Alouani | H02J 13/00 |
| 2019/0039465 A1* | 2/2019 | Jang | B60L 53/665 |
| 2019/0061535 A1* | 2/2019 | Bridges | H02J 3/381 |
| 2019/0061547 A1* | 2/2019 | Vargas-Reighley | H04L 67/125 |
| 2019/0126761 A1* | 5/2019 | Verbridge | H01M 10/4207 |
| 2019/0146537 A1* | 5/2019 | Forbes, Jr. | H02J 3/14 700/295 |
| 2019/0263271 A1* | 8/2019 | Ashby | G06Q 40/04 |
| 2019/0275893 A1* | 9/2019 | Sham | B60L 58/12 |
| 2019/0291589 A1* | 9/2019 | Erb | B60L 53/665 |
| 2019/0299803 A1* | 10/2019 | Cheng | B60L 53/16 |
| 2019/0347873 A1* | 11/2019 | Ricci | A61B 5/1172 |
| 2019/0389314 A1* | 12/2019 | Zhu | B60L 53/14 |
| 2019/0389315 A1* | 12/2019 | Zhu | B60L 53/64 |
| 2020/0026318 A1* | 1/2020 | Forbes, Jr. | H02J 13/00004 |
| 2020/0039374 A1* | 2/2020 | Straßer | B60L 53/18 |
| 2020/0062138 A1* | 2/2020 | Smolenaers | B60L 55/00 |
| 2020/0086756 A1* | 3/2020 | Beaude | B60L 53/66 |
| 2020/0101850 A1* | 4/2020 | Harty | B60L 55/00 |
| 2020/0139827 A1* | 5/2020 | Koolen | B60L 53/63 |
| 2020/0139838 A1* | 5/2020 | Chan | B60L 53/63 |
| 2020/0164755 A1* | 5/2020 | Smolenaers | B60L 53/53 |
| 2020/0171968 A1* | 6/2020 | Patil | H02J 7/0071 |
| 2020/0180460 A1* | 6/2020 | Watson | B60L 53/68 |
| 2020/0180465 A1* | 6/2020 | Watson | B60L 53/68 |
| 2020/0215924 A1* | 7/2020 | Kamen | B60L 58/12 |
| 2020/0282859 A1* | 9/2020 | Shin | B60L 53/66 |
| 2020/0290474 A1* | 9/2020 | Cashdollar | B60L 53/62 |
| 2020/0307404 A1* | 10/2020 | Chan | B60L 53/63 |
| 2020/0324667 A1* | 10/2020 | Yaldo | B60L 58/12 |
| 2020/0353825 A1* | 11/2020 | Silorio | B60L 53/665 |
| 2020/0381923 A1* | 12/2020 | Chow | H01M 10/4207 |
| 2020/0391607 A1* | 12/2020 | Wang | B60L 53/62 |
| 2020/0391608 A1* | 12/2020 | Wang | B60L 53/67 |
| 2020/0401176 A1* | 12/2020 | Forbes, Jr. | H02J 13/00004 |

(56) References Cited

U.S. PATENT DOCUMENTS

| | | | |
|---|---|---|---|
| 2020/0412126 A1* | 12/2020 | Alouani | G05B 19/048 |
| 2020/0412147 A1* | 12/2020 | Mandel | H02J 7/0071 |
| 2021/0001734 A1* | 1/2021 | Reynolds | B60L 53/68 |
| 2021/0001735 A1* | 1/2021 | Reynolds | B60L 53/305 |
| 2021/0073876 A1* | 3/2021 | Khoo | G06Q 50/06 |
| 2021/0090139 A1* | 3/2021 | Khoo | G01C 21/3492 |
| 2021/0090140 A1* | 3/2021 | Khoo | B60L 53/305 |
| 2021/0155107 A1* | 5/2021 | Yan | B60L 53/67 |
| 2021/0252991 A1* | 8/2021 | Pizzurro | B60L 53/11 |
| 2021/0316631 A1* | 10/2021 | Morgan | B60L 53/62 |
| 2021/0347279 A1* | 11/2021 | Erikson | H02J 7/0019 |
| 2021/0347280 A1* | 11/2021 | Erikson | B60L 53/30 |
| 2021/0387544 A1* | 12/2021 | Reynolds | B60L 53/305 |
| 2021/0405116 A1* | 12/2021 | Lee | H02J 7/0047 |
| 2022/0004214 A1* | 1/2022 | Forbes, Jr. | H04L 67/10 |
| 2022/0024330 A1* | 1/2022 | Books | B60L 53/57 |
| 2022/0032811 A1* | 2/2022 | Wang | B60L 53/68 |
| 2022/0045530 A1* | 2/2022 | Silorio | B60L 53/14 |
| 2022/0050143 A1* | 2/2022 | Maeda | G01R 31/382 |
| 2022/0080850 A1* | 3/2022 | Reynolds | H02J 7/0049 |
| 2022/0134901 A1* | 5/2022 | Wang | B60L 53/62 320/109 |
| 2022/0144117 A1* | 5/2022 | Smolenaers | B60L 53/51 |
| 2022/0172550 A1* | 6/2022 | Ahtikari | G06K 7/10366 |
| 2022/0194236 A1* | 6/2022 | Whiting | B60L 53/64 |
| 2022/0194254 A1* | 6/2022 | Gupta | B60L 53/305 |
| 2022/0274503 A1* | 9/2022 | Shin | B60L 53/66 |
| 2022/0305942 A1* | 9/2022 | Mannepalli | B60L 53/68 |
| 2022/0333942 A1* | 10/2022 | Cun | B60L 53/68 |
| 2022/0379763 A1* | 12/2022 | Kydd | B60L 53/64 |
| 2023/0015366 A1* | 1/2023 | Ferguson | G05D 1/0083 |
| 2023/0022599 A1* | 1/2023 | Logvinov | H02J 7/00711 |
| 2023/0033955 A1* | 2/2023 | Seroff | B60L 53/53 |
| 2023/0062237 A1* | 3/2023 | Hou | G06K 7/1417 |
| 2023/0098157 A1* | 3/2023 | Hou | B60L 53/305 320/109 |
| 2023/0131483 A1* | 4/2023 | Cashdollar | H02J 7/0013 320/109 |
| 2023/0211679 A1* | 7/2023 | Reynolds | B60L 53/63 320/109 |
| 2023/0211680 A1* | 7/2023 | Silorio | G05B 19/042 700/295 |
| 2023/0211686 A1* | 7/2023 | Smolenaers | B60L 53/53 320/109 |
| 2023/0211697 A1* | 7/2023 | Xia | H02J 7/0045 320/109 |
| 2023/0244260 A1* | 8/2023 | Forbes, Jr. | H02J 3/322 700/295 |
| 2023/0256854 A1* | 8/2023 | Shin | H02J 7/04 320/109 |
| 2023/0278452 A1* | 9/2023 | Kennedy | B60L 53/16 320/109 |
| 2023/0286409 A1* | 9/2023 | Feldman | B60L 53/14 |
| 2023/0311700 A1* | 10/2023 | Shin | B60L 53/66 320/109 |
| 2023/0382252 A1* | 11/2023 | Kamen | G06Q 30/08 |
| 2023/0410162 A1* | 12/2023 | Khoo | H04W 4/023 |
| 2024/0022073 A1* | 1/2024 | McCormick | B60L 53/63 |
| 2024/0045460 A1* | 2/2024 | Forbes, Jr. | H02J 3/322 |
| 2024/0109443 A1* | 4/2024 | Chan | B60L 53/63 |
| 2024/0116388 A1* | 4/2024 | Kiessling | B60L 53/67 |
| 2024/0140212 A1* | 5/2024 | Kaufman | B60L 53/20 |
| 2024/0174117 A1* | 5/2024 | Holcomb | H04L 67/125 |
| 2024/0227611 A1* | 7/2024 | Ju | B60L 53/31 |
| 2024/0253485 A1* | 8/2024 | Cho | B60L 53/67 |
| 2024/0270111 A1* | 8/2024 | TenHouten | H02J 7/007194 |
| 2024/0294075 A1* | 9/2024 | Reynolds | B60L 53/68 |
| 2024/0294076 A1* | 9/2024 | Silorio | B60L 53/68 |
| 2024/0402747 A1* | 12/2024 | Forbes, Jr. | H02J 3/14 |
| 2025/0156913 A1* | 5/2025 | Khoo | G06Q 50/06 |
| 2025/0156914 A1* | 5/2025 | Khoo | H04W 4/02 |

\* cited by examiner

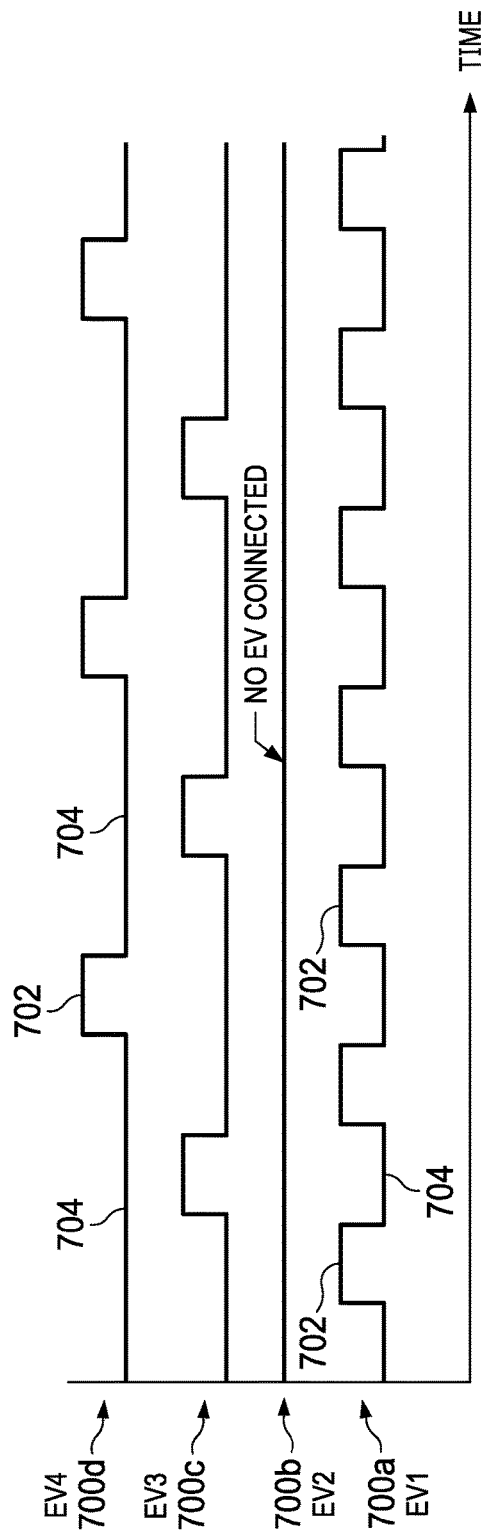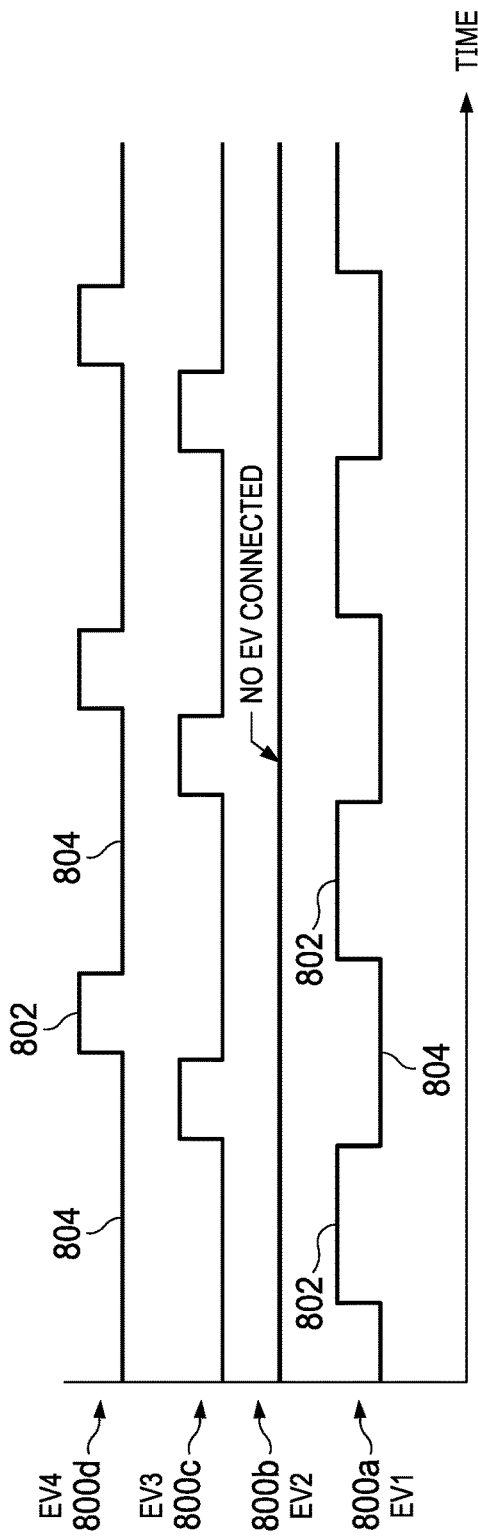

CONTROLLER 1800
FIG. 18
INSTRUCTION PROCESSING UNIT 1802
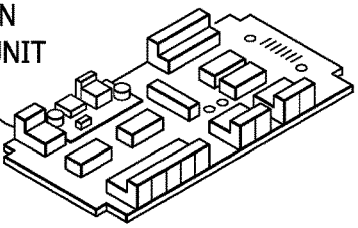
USER INTERFACE MODULES 1804
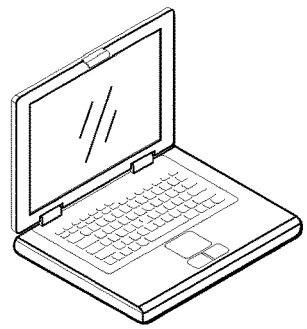 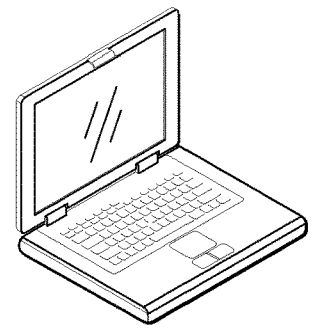
CHARGING INTERFACE MODULES EVSE STATIONS 1808a
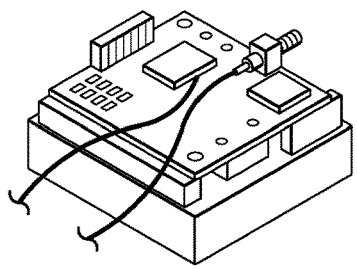 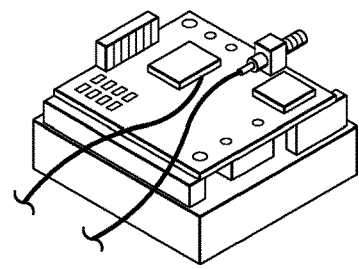
CHARGING INTERFACE MODULES POWER RELAYS 1808b
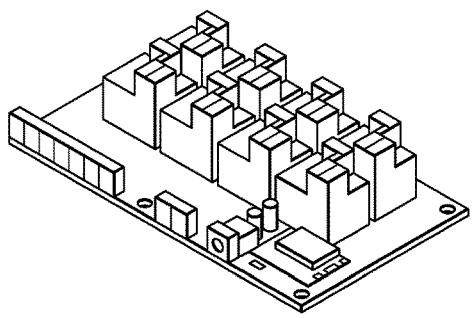 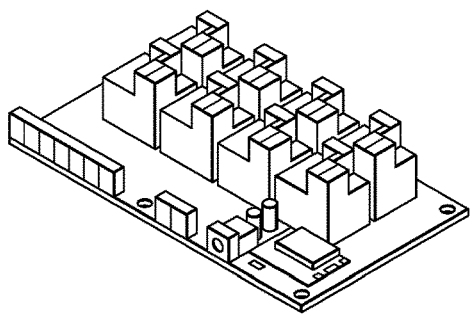

ELECTRIC VEHICLE CHARGING MASTER CONTROLLER

FIELD

This disclosure relates to the field of electric vehicle chargers. More particularly, but not exclusively, this disclosure relates to controllers for electric vehicle chargers.

BACKGROUND

Electric vehicles include batteries that periodically need to be charged. As the number of electric vehicles increases, it is becoming common for workplaces, shopping centers, dining establishments, entertainment venues, and lodging establishments to offer charging facilities for employees' and customers' electric vehicles. Businesses that own electric vehicles may also have charging facilities for their vehicles. Also, some governments are requiring or encouraging public agencies or businesses, or both, to offer charging facilities.

In many cases, providing dedicated charging stations for each electric vehicle to be charged would present a severe financial burden. Moreover, in many cases, the electric vehicles are on site for longer times than needed to adequately charge their batteries. Accordingly, a solution that enables charging vehicles using a smaller number of charging stations would be valuable. Moreover, a solution that provides vehicle charging without a need to move the vehicles from non-charging parking spaces to charging stations would also be valuable.

SUMMARY

The present disclosure introduces an electric vehicle charging master controller, referred to herein as the controller. The controller includes an instruction processing unit, a user interface module, and a charging interface module. The instruction processing unit is configured to execute instructions for charging electric vehicles (EVs). The user interface module is configured to receive information from the instruction processing unit and transmit information to a user interface. The user interface module is further configured to receive information from the user interface and transmit information to the controller. The user interface may be external to the controller.

Electric vehicle (EV) charging equipment is external to the controller. The charging interface module is configured to receive information from the instruction processing unit and transmit information to the EV charging equipment. At least a first EV and a second EV are coupled to the EV charging equipment.

The instruction processing unit is configured to transmit information to the charging interface module, which is designed to cause the EV charging equipment to direct charging current to the plurality of EVs, one at a time. The instruction processing unit is also configured to transmit information to the charging interface module designed to cause the EV charging equipment to stop the charging current to each EV when a charging cessation criterion has been met. The charging cessation criterion may be one of a plurality of charging cessation criteria.

BRIEF DESCRIPTION OF THE VIEWS OF THE DRAWINGS

FIG. 7 is a time chart of an example charging scheme for EVs that takes EV high priority status into account, according to an embodiment of this disclosure.

FIG. 8 is a time chart of an example charging scheme for EVs that takes EV high priority status into account, according to another embodiment of this disclosure.

FIG. 18 depicts an example distributed configuration of a controller for managing charging of EVs according to any of the example charging schemes disclosed.

DETAILED DESCRIPTION

Figure 1:
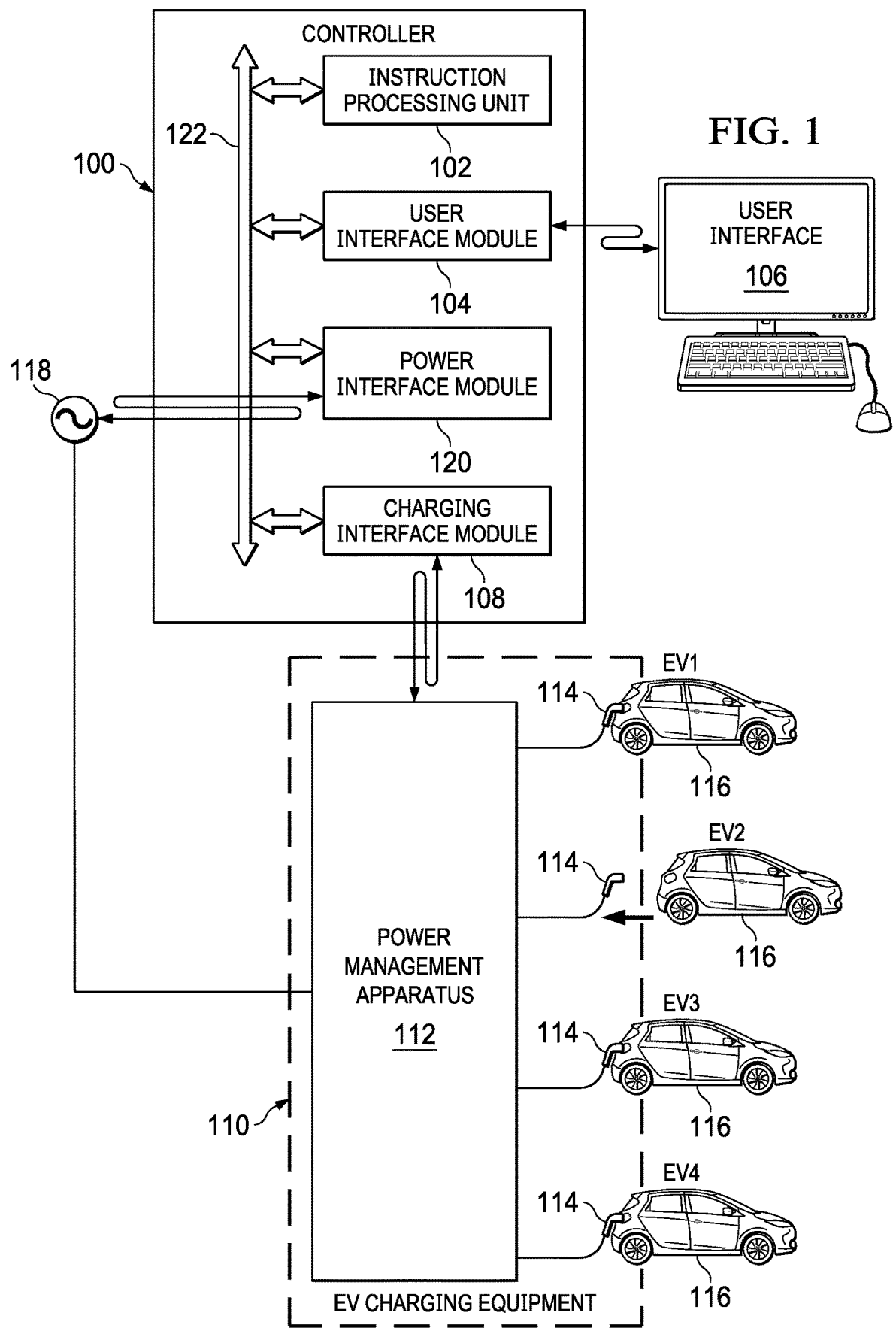
FIG. 1 is a schematic diagram of an example EV charging configuration having a controller, EV charging equipment, and EVs.

The present disclosure is described with reference to the attached figures. The figures are not drawn to scale and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

An electric vehicle charging master controller, referred to herein as the controller, is disclosed for charging a plurality of electric vehicles (EVs). The controller includes at least an instruction processing unit, a user interface module, and a charging interface module. The instruction processing unit is configured to transmit information to at least the user interface module and the charging interface module, and to receive information from at least the user interface module. The user interface module is configured to receive information from the instruction processing unit and transmit information to a user interface. The user interface is configured to receive information from a user during operation of the controller and transmit user information to the user interface module. The charging interface module is configured to receive information from the instruction processing unit.

During operation of the controller, EV charging equipment is connected to the charging interface module. The EV charging equipment is external to the controller. The plurality of EVs are coupled to the EV charging equipment during operation of the controller. The charging interface module is configured to control operation of the EV charging equipment by directing charging current to the EVs.

In one aspect, the EV charging equipment may include a plurality of electric vehicle service equipment (EVSE) stations connected directly to the EVs, sometimes referred to as smart charging stations, and the controller may select one of the EVSE stations at a time to provide charging current. In another aspect, the EV charging equipment may include one or more EVSE stations, with each station coupled to a plurality of charging heads plugged into the EVs, and the controller may direct charging current from each EVSE station to one of the charging heads of each EVSE station. In a further aspect, the EV charging equipment may include relays or multiplexers connected to a plurality of charging heads plugged into the EVs, and the controller may direct charging current from a power line through the relays or multiplexers to a subset of the EVs.

Operational characteristics, such as information transmission and reception, and current flow, of various components of the controller and the EV charging equipment, are described herein. It is understood that described operational characteristics of the components occur during operation of the controller and the EV charging equipment, and are not expected to be manifested when the controller and the EV charging equipment are not operated. Described actions and operations are understood to disclose actions and operation which the controller and the EV charging equipment are configured to perform.

The examples disclosed herein sometimes describe one or more components connected to, or contained within, other components to provide a desired functionality. Disclosed configurations are described merely by way of example, and it will be appreciated that other configurations may be manifested to provide substantially the same functionality. In a conceptual sense, any configuration of components to provide the same functionality may be considered as "associated with" each other, irrespective of specifics of the configuration. Likewise, any components so associated may also be considered to be "operably coupled" to provide the same functionality, and any components capable of being so associated may be considered to be "operably couplable" to provide the same functionality. Components which are operably coupled may be, for example, directly electrically coupled, wirelessly coupled, optically coupled, and/or acoustically coupled. References in the singular tense include the plural, and vice versa, unless otherwise noted. For the purposes of this disclosure, it will be understood that, if an element is referred to as being "connected" or "coupled" to another element, it may be directly connected or directly coupled to the other element, or intervening elements may be present. If an element is referred to as being "directly coupled" or "directly connected" to another element, it is understood there are no other intentionally disposed intervening elements present.

FIG. 1 is a schematic diagram of an example EV charging configuration having a controller, EV charging equipment, and EVs. The controller 100 includes an instruction processing unit 102, a user interface module 104 coupled to a user interface 106, and a charging interface module 108 coupled to EV charging equipment 110. The instruction processing unit 102 is configured to transmit information to the user interface module 104 and the charging interface module 108, and to receive information from the user interface module 104. The instruction processing unit 102 may optionally be configured to receive information from the charging interface module 108, as indicated in FIG. 1.

The user interface module 104 is configured to transmit information to the user interface 106 and receive information from the user interface 106. The user interface 106 may be implemented as a computer, as depicted in FIG. 1, or other user interactive device, such as a cellphone or tablet, a dedicated console, or a web page, by way of example. During operation of the controller 100, the instruction processing unit 102 transmits information, such as status of the EV charging equipment 110, present and future electric power price rates, and requests for user preferences, to the user interface module 104. The user interface module 104 formats the information from the instruction processing unit 102 to be compatible with the user interface 106 and transmits the formatted information to the user interface 106. User preferences, such as charging priorities or electric power rate limits, are transmitted from the user interface 106 to the user interface module 104. The user interface module 104 formats the information from the user interface 106 to be compatible with the instruction processing unit 102 and transmits the formatted information to the instruction processing unit 102.

The charging interface module 108 is configured to transmit information to the EV charging equipment 110, and may optionally be configured to receive information from the EV charging equipment 110. The EV charging equipment 110 includes a power management apparatus 112 connected to a plurality of charging heads 114. Some or all of the charging heads 114 are connected to EVs 116, labeled "EV 1" through "EV 4" in FIG. 1. FIG. 1 depicts three EVs 116 connected to the charging heads 114, and a fourth EV 116, EV 2, in the process of being connected to a charging head 114. During operation of the controller 100, the instruction processing unit 102 transmits information to the charging interface module 108, such as instructions to start or stop charging current to a specific EV 116 connected to a specific charging head 114. The charging interface module 108 formats the information from the instruction processing unit 102 to be compatible with the EV charging equipment 110 and transmits the formatted information to the EV charging equipment 110. The EV charging equipment 110 in turn starts or stops the charging current to the specific EV 116 through the specific charging head 114. The EV charging equipment 110 may transmit information to the charging interface module 108, such as charge capacity of the EV 116 being charged. The charging interface module 108 formats the information from the EV charging equipment 110 to be compatible with the instruction processing unit 102 and transmits the formatted information to the instruction processing unit 102.

Electric power is provided by a power source 118 such as an alternating current (AC) power source operating at 120 volts or 240 volts, to the EV charging equipment 110. The power source 118 may be manifested as a power circuit controlled by a circuit breaker, with the power provided from an electric utility provider, for example. Other manifestations of the power source 118 are within the scope of this example. The EV charging equipment 110 may condition the electric power to facilitate charging the EVs 116. For example, the EV charging equipment 110 may adjust a voltage of the electric power to achieve a higher charging rate, or may rectify AC power to direct current (DC) power and filter the electric power.

The controller 100 may optionally include a power interface module 120. The instruction processing unit 102 is configured to transmit information to the power interface module 120 and to receive information from the power interface module 120. The power interface module 120 is configured to transmit information to the power source 118 and may optionally be configured to receive information from the power source 118. During operation of the controller 100, the instruction processing unit 102 transmits information to the power interface module 120, such as queries for available power levels, or present and/or future electric power price rates. The power interface module 120 formats the information from the instruction processing unit 102 to be compatible with the power source 118 and transmits the formatted information to the power source 118. The power source 118 in turn transmits information, such as available power levels, present electric power price rates, or future electric power price rates to the power interface module 120. The power interface module 120 formats the information from the power source 118 to be compatible with the instruction processing unit 102 and transmits the formatted information to the instruction processing unit 102.

The instruction processing unit 102, the user interface module 104, the charging interface module 108 and the power interface module 120 may be located together as a single unit, or may be dispersed in different locations in a facility for charging the EVs 116, or may be dispersed in more than one facility. The instruction processing unit 102 may exchange information with the user interface module 104, the charging interface module 108 and the power interface module 120 through a communication channel 122. In one aspect, the communication channel 122 may be implemented as a common communication channel, shared by the instruction processing unit 102, the user interface module 104, the charging interface module 108 and the power interface module 120. In another aspect, the communication channel 122 may be implemented as a combination of separate channels: a first channel between the instruction processing unit 102 and the user interface module 104, a second channel between the instruction processing unit 102 and the charging interface module 108, and a third channel between the instruction processing unit 102 and the power interface module 120. In one aspect, the communication channel 122 may be implemented as a solid physical medium, such as wires or fiber optic cables, connecting the instruction processing unit 102, the user interface module 104, the charging interface module 108 and the power interface module 120. In another aspect, the communication channel 122 may be implemented as a disconnected medium, such as a wireless or optical medium propagating through air. In a further aspect, the communication channel 122 may be implemented as a combination of a solid physical medium and a disconnected medium.

Figure 2:
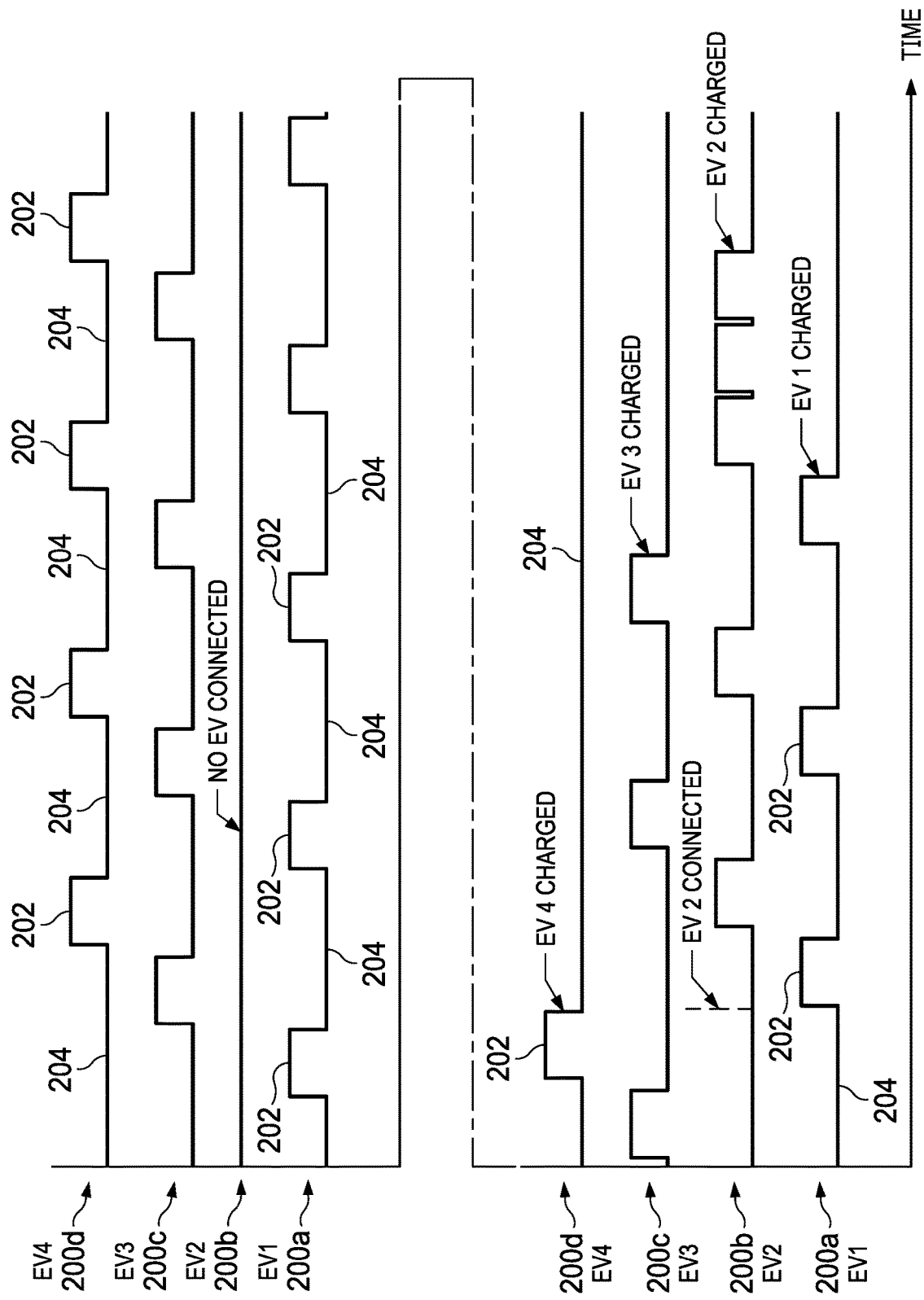
FIG. 2 is a time chart of an example sequential charging scheme for EVs, according to an embodiment of this disclosure.

FIG. 2 is a time chart of an example sequential charging scheme for EVs, according to an embodiment of this disclosure. The horizontal axis depicts time elapsed during charging. The vertical axis depicts charging status for each of four EVs, for example, the four EVs 116 of FIG. 1. A first trace 200a for EV 1 shows charging periods 202 as higher levels and non-charging periods 204 as lower levels of the first trace 200a. A second trace 200b depicts charging status for EV 2, a third trace 200c depicts charging status for EV 3, and a fourth trace 200d depicts charging status for EV 4. The EVs 1 through 4 are charged by a charging system using a controller, as disclosed in reference to the controller 100 of FIG. 1.

In this example, the controller 100 is configured to direct charging current sequentially to each of the EVs 116, one at a time, repeatedly, until each EV 116 is charged. Thus, the instruction processing unit 102 transmits a first set of information to the charging interface module 108 to direct charging current to EV 1 for a first prescribed time period, while no charging current is directed to the remaining EVs 116, that is, EVs 2 through 4, in this example. After the first prescribed time period, a first charging cessation criterion is met, namely, expiration of the first prescribed time period, and the instruction processing unit 102 transmits a second set of information to the charging interface module 108 to stop the charging current to EV 1, and subsequently transmits a third set of information to the charging interface module 108 to direct charging current to EV 2 for a second prescribed time period, while no charging current is directed to EVs 1, 3, and 4. In this example, EV 2 is not connected to a charging head 114 of FIG. 1 at the time, and the charging interface module 108 transmits information to the instruction processing unit 102 that EV 2 is not connected. The instruction processing unit 102 receives the information from the charging interface module 108 and subsequently transmits a fourth set of information to the charging interface module 108 to direct charging current to EV 3 for a third prescribed time period, while no charging current is directed to EVs 1, 2, and 4. After the third prescribed time period, a second charging cessation criterion is met, namely, expiration of the third prescribed time period, and the instruction processing unit 102 transmits a fifth set of information to the charging interface module 108 to stop the charging current to EV 3, and subsequently transmits a sixth set of information to the charging interface module 108 to direct charging current to EV 4 for a fourth prescribed time period, while no charging current is directed to EVs 1, 2, and 3. In this example, the first through fourth prescribed time periods may all be equal, and may be, for example, 15 minutes to 60 minutes. Other durations for the prescribed time periods are within the scope of this example.

After the fourth prescribed time period, this cycle is repeated, sequentially charging the EVs 1, 3 and 4 for prescribed time periods, as indicated in FIG. 2. When EV 2 is connected to the corresponding charging head 114, EV 2 is charged in sequence with the other EVs, as indicated in FIG. 2. After one or more charging cycles, each of the EVs 1 through 4 may be sufficiently charged that no further charging current is directed to that EV. The instruction processing unit 102 transmits information to the charging interface module 108 to direct charging current to the sufficiently charged EV, and the charging interface module 108 transmits information to the instruction processing unit 102 that the sufficiently charged EV meets a charging cessation criterion, namely, the EV is sufficiently charged.

The instruction processing unit 102 receives the information from the charging interface module 108 that the charging cessation criterion has been met, and the instruction processing unit 102 subsequently transmits information to the charging interface module 108 to direct charging current to the next EV in sequence. In one aspect of this disclosure, the charging cessation criterion that the EV is sufficiently charged may be met when a voltage of batteries in the EV reach a prescribed threshold. In another aspect, the charging cessation criterion that the EV is sufficiently charged may be met when the charging current drops below a prescribed limit. In a further aspect, the charging cessation criterion that the EV is sufficiently charged may be met when the EV transmits information to the charging interface module 108 that the charge status of the EV meets one or more specific criteria for the EV. The sequential charging cycle of FIG. 2 may be continued until all EVs connected to the EV charging equipment 110 of FIG. 1 are sufficiently charged, as indicated in FIG. 2.

Figure 3:
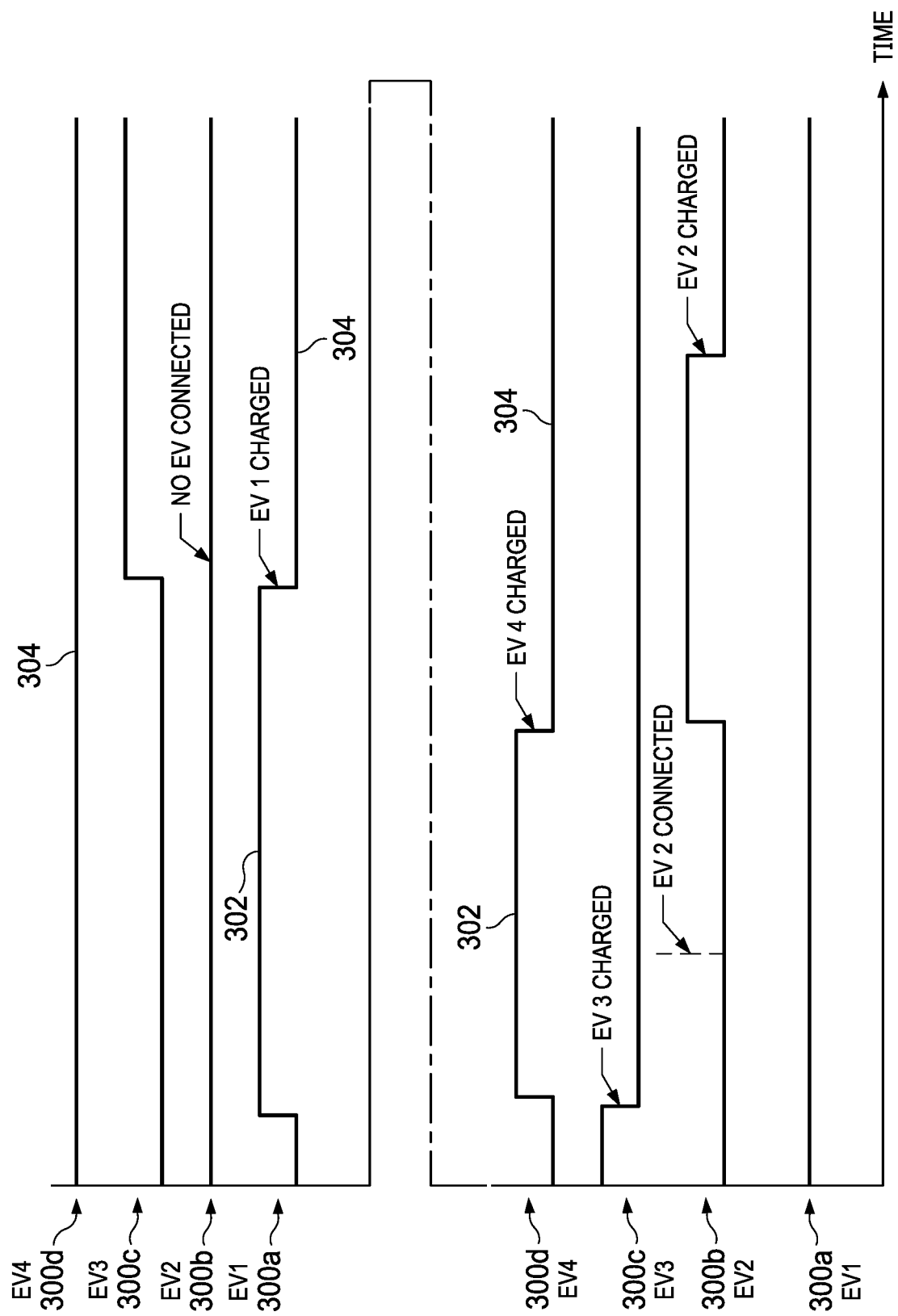
FIG. 3 is a time chart of another example serial charging scheme for EVs, according to an embodiment of this disclosure.

FIG. 3 is a time chart of another example serial charging scheme for EVs, according to an embodiment of this disclosure. The horizontal axis depicts time elapsed during charging. The vertical axis depicts charging status for each of four EVs, for example, the four EVs 116 of FIG. 1. A first trace 300a for EV 1 shows charging periods 302 as higher levels and non-charging periods 304 as lower levels of the first trace 300a. A second trace 300b depicts charging status for EV 2, a third trace 300c depicts charging status for EV 3, and a fourth trace 300d depicts charging status for EV 4. The EVs 1 through 4 are charged by a charging system using a controller, as disclosed in reference to the controller 100 of FIG. 1.

In this example, the controller 100 is configured to direct charging current serially to each of the EVs 116, one at a time, charging each of the EVs 116 continuously, until that EV is charged before proceeding to charge another of the EVs 116. In this example, a charging cessation criterion may be met when an EV is sufficiently charged. Another charging cessation criterion may be met when charging current to the EV falls below a prescribed limit. A further charging cessation criterion may be met when the EV transmits information to the charging interface module 108 that the charge status of the EV meets one or more specific criteria for the EV. Thus, the instruction processing unit 102 transmits a first set of information to the charging interface module 108 to direct charging current to EV 1 until EV 1 is sufficiently charged, while no charging current is directed to the remaining EVs 116, that is, EVs 2 through 4, in this example. After EV 1 is sufficiently charged, a charging cessation criterion is met, and the instruction processing unit 102 transmits a second set of information to the charging interface module 108 to stop the charging current to EV 1, and subsequently transmits a third set of information to the charging interface module 108 to direct charging current to EV 2, while no charging current is directed to EVs 1, 3, and 4. In this example, EV 2 is not connected to a charging head 114 of FIG. 1 at the time, as indicated in FIG. 3, and the charging interface module 108 transmits information to the instruction processing unit 102 that EV 2 is not connected. The instruction processing unit 102 receives the information from the charging interface module 108 and subsequently transmits a fourth set of information to the charging interface module 108 to direct charging current to EV 3 until EV 3 is sufficiently charged, while no charging current is directed to EVs 1, 2, and 4. After EV 3 is sufficiently charged, a charging cessation criterion is met, and the instruction processing unit 102 transmits a fifth set of information to the charging interface module 108 to stop the charging current to EV 3, and subsequently transmits a sixth set of information to the charging interface module 108 to direct charging current to EV 4 until EV 4 is sufficiently charged, while no charging current is directed to EVs 1, 2, and 3. After EV 4 is sufficiently charged, a charging cessation criterion is met, and the instruction processing unit 102 transmits a seventh set of information to the charging interface module 108 to stop the charging current to EV 4. After the last EV of the plurality of EVs, that is, EV 4 in this example, is sufficiently charged, the cycle of serial charging is started again. The instruction processing unit 102 transmits information to the charging interface module 108 to direct charging current to EV 1. The charging interface module 108 transmits information to the instruction processing unit 102 that the sufficiently charged EV 1 meets a charging cessation criterion. The instruction processing unit 102 receives the information from the charging interface module 108 that the charging cessation criterion has been met, and subsequently transmits information to the charging interface module 108 to direct charging current to EV 2, which is now connected to the EV charging equipment 110 of FIG. 1, as indicated in FIG. 3, until EV 2 is sufficiently charged, while no charging current is directed to EVs 1, 3, and 4. After EV 2 is sufficiently charged, a charging cessation criterion is met, and the instruction processing unit 102 transmits information to the charging interface module 108 to stop the charging current to EV 2, and subsequently transmits information to the charging interface module 108 to direct charging current to EV 3. The charging interface module 108 transmits information to the instruction processing unit 102 that the sufficiently charged EV 3 meets a charging cessation criterion, and subsequently transmits information to the charging interface module 108 to direct charging current to EV 4. This process of instruction processing unit 102 transmitting information to the charging interface module 108 to the next EV 116 in the plurality of EVs 116 may be continued, so as to subsequently charge additional EVs which are later connected to the EV charging equipment 110.

Figure 4:
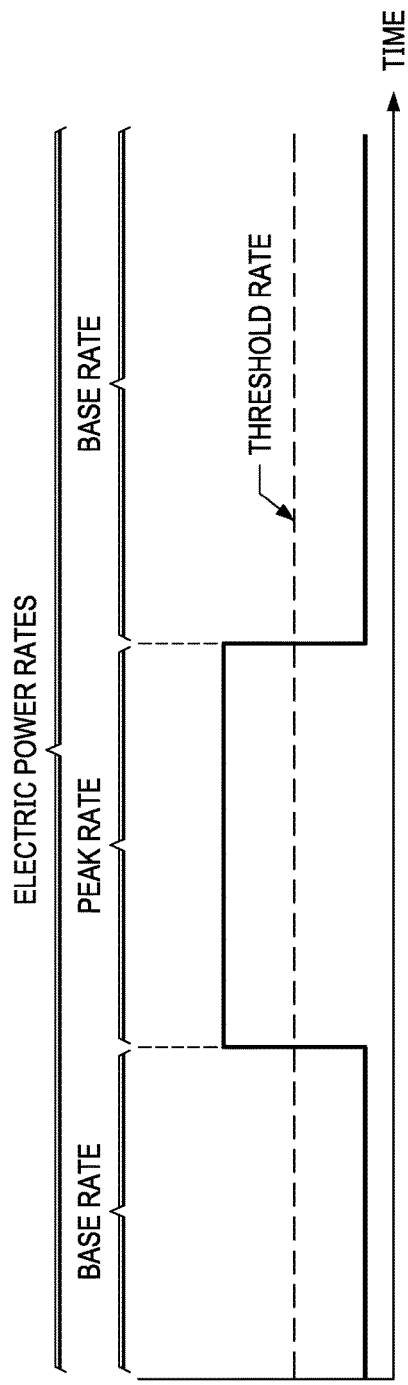
FIG. 4 is a chart of example electric power rates versus time.

FIG. 4 is a chart of example electric power rates versus time. The horizontal axis depicts time, which may span a full day, or a longer period. The vertical axis depicts the electric power rates, in arbitrary units. In this example, the electric power base rates are charged during base rate periods of time, labeled "BASE RATE" in FIG. 4, and peak rates are charged during peak rate periods of time, labeled "PEAK RATE" in FIG. 4. Electric utilities often apply higher rates during periods of peak usage, such as 3:00 PM to 8:00 PM. The peak rates may be 10 percent to 100 percent higher than the base rates, by way of example. More complicated rate schedules are sometimes applied, with intermediate rates between the base rates and the peak rates. The electric power rates may be factored in the charging sequence by the controller 100 of FIG. 1 when directing charging current to the EVs 116. For example, a user may input a threshold rate, labeled "THRESHOLD RATE" in FIG. 4, to the user interface 106 of FIG. 1. The user interface 106 may relay the threshold rate information to the instruction processing unit 102 through the user interface module 104 of FIG. 1. The controller 100 may direct charging current to the EVs 116 when the electric power rate is at or below the threshold rate and pause charging when the electric power rate is above the threshold rate.

Figure 5:
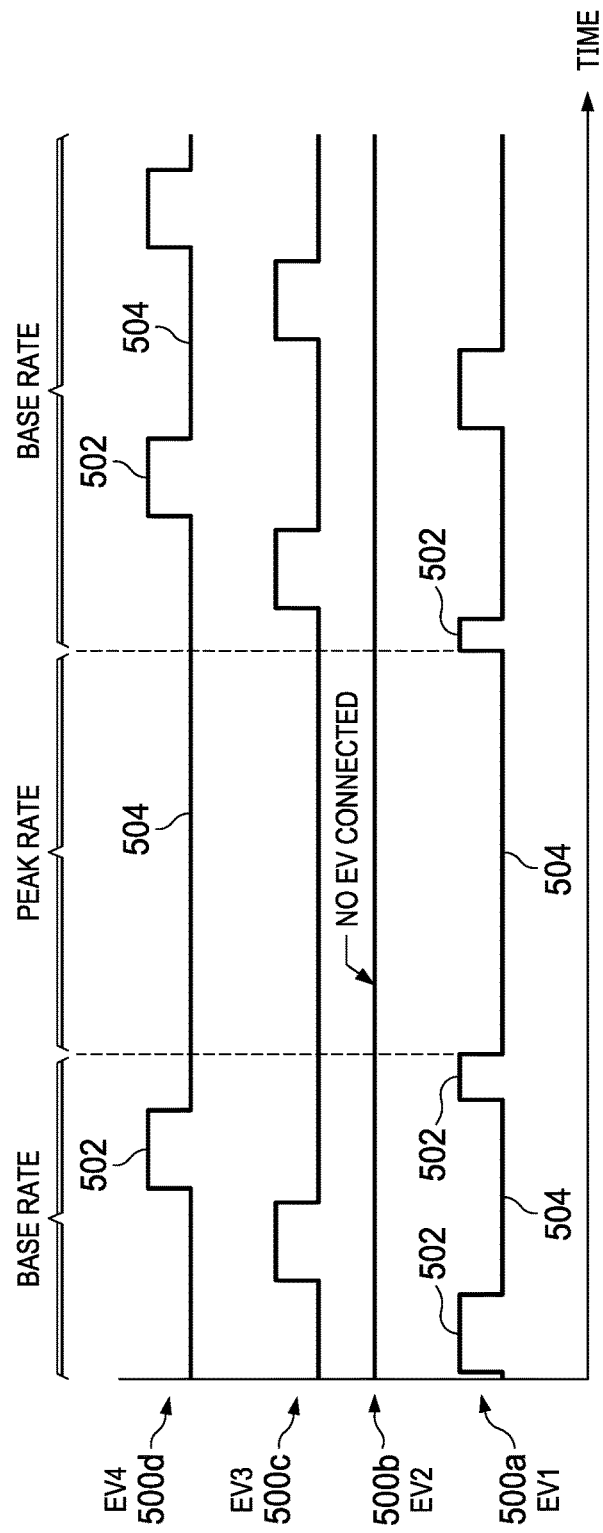
FIG. 5 is a time chart of an example charging scheme for EVs that takes electric power rates into account, according to an embodiment of this disclosure.

FIG. 5 is a time chart of an example charging scheme for EVs that takes electric power rates into account, according to an embodiment of this disclosure. The horizontal axis depicts time elapsed during charging. The vertical axis depicts charging status for each of four EVs, for example, the four EVs 116 of FIG. 1. A first trace 500*a* depicts charging status for EV 1, a second trace 500*b* depicts charging status for EV 2, a third trace 500*c* depicts charging status for EV 3, and a fourth trace 500*d* depicts charging status for EV 4. Charging periods 502 are depicted as higher levels of the traces 500*a* through 500*d*, and non-charging periods 504 are depicted as lower levels of the traces 500*a* through 500*d*. The EVs 1 through 4 are charged by a charging system using a controller, as disclosed in reference to the controller 100 of FIG. 1. The electric power rates for this example are as shown in FIG. 4. A charging cessation criterion may be met according to any of the criteria disclosed in reference to FIG. 3. Furthermore, in this example, a charging cessation criterion may be met when the electric power rate is above the base rate, or above the threshold rate.

In this example, the controller 100 is configured to direct charging current sequentially to each of the EVs 116 during the base rate periods of FIG. 4, one at a time, repeatedly, until each EV 116 is charged. Thus, if the base rates are in effect, the instruction processing unit 102 transmits a first set of information to the charging interface module 108 to direct charging current to EV 1 for a first prescribed time period, while no charging current is directed to the remaining EVs 116, that is, EVs 2 through 4, in this example. After the first prescribed time period expires, a charging cessation criterion is met, and the instruction processing unit 102 transmits a second set of information to the charging interface module 108 to stop the charging current to EV 1, and, if the base rates are still in effect, subsequently transmits a third set of information to the charging interface module 108 to direct charging current to EV 2 for a second prescribed time period, while no charging current is directed to EVs 1, 3, and 4. In this example, EV 2 is not connected to a charging head 114 of FIG. 1 at the time, and the charging interface module 108 transmits information to the instruction processing unit 102 that EV 2 is not connected. The instruction processing unit 102 receives the information from the charging interface module 108 and subsequently transmits a fourth set of information to the charging interface module 108 to direct charging current to EV 3 for a third prescribed time period, while no charging current is directed to EVs 1, 2, and 4. After the third prescribed time period expires, a charging cessation criterion is met, and the instruction processing unit 102 transmits a fifth set of information to the charging interface module 108 to stop the charging current to EV 3, and, if the base rates are still in effect, subsequently transmits a sixth set of information to the charging interface module 108 to direct charging current to EV 4 for a fourth prescribed time period, while no charging current is directed to EVs 1, 2, and 3. After the fourth prescribed time period expires, a charging cessation criterion is met, and the instruction processing unit 102 transmits a seventh set of information to the charging interface module 108 to stop the charging current to EV 4, and, if the base rates are still in effect, subsequently transmits information to the charging interface module 108 to direct charging current to EV 1 for the first prescribed time period, while no charging current is directed to EVs 2, 3, and 4. In this example, while the charging current is provided to EV 1, the electric power rate rises to the peak rate, causing a charging cessation criterion to be met, and the instruction processing unit 102 transmits information to the charging interface module 108 to stop the charging current to EV 1. In one version of this example, the instruction processing unit 102 may have information from the power interface module 120 of FIG. 1 regarding timing of the change in the electric power rate, and the information to the charging interface module 108 to stop the charging current may be transmitted before the electric power rate rises. In this version, a charging cessation criterion may be met by anticipation of the electric power rate rising within a prescribed time interval, for example, a time interval for stopping the charging current before incurring the higher electric power rate. In another version of this example, information regarding the change in the electric power rate may be communicated to the instruction processing unit 102 through the power interface module 120 in real time, and the information to the charging interface module 108 to stop the charging current may be transmitted shortly after the electric power rate rises.

In this example, charging of the EVs 116 may be paused while the electric power rate is above the base rate, or above the threshold rate, as indicated in FIG. 5. Later, when the electric power rate drops to the threshold or to the base rate, charging may be resumed. In this example, charging of EV 1 is resumed for the remainder of the first prescribed time period, as indicated in FIG. 5. Subsequently, sequential charging of EV 3 and EV 4, and then back to EV 1, is performed, until all EVs connected to the EV charging equipment 110 of FIG. 1 are sufficiently charged. In this example, the first through fourth prescribed time periods may all be equal.

Figure 6:
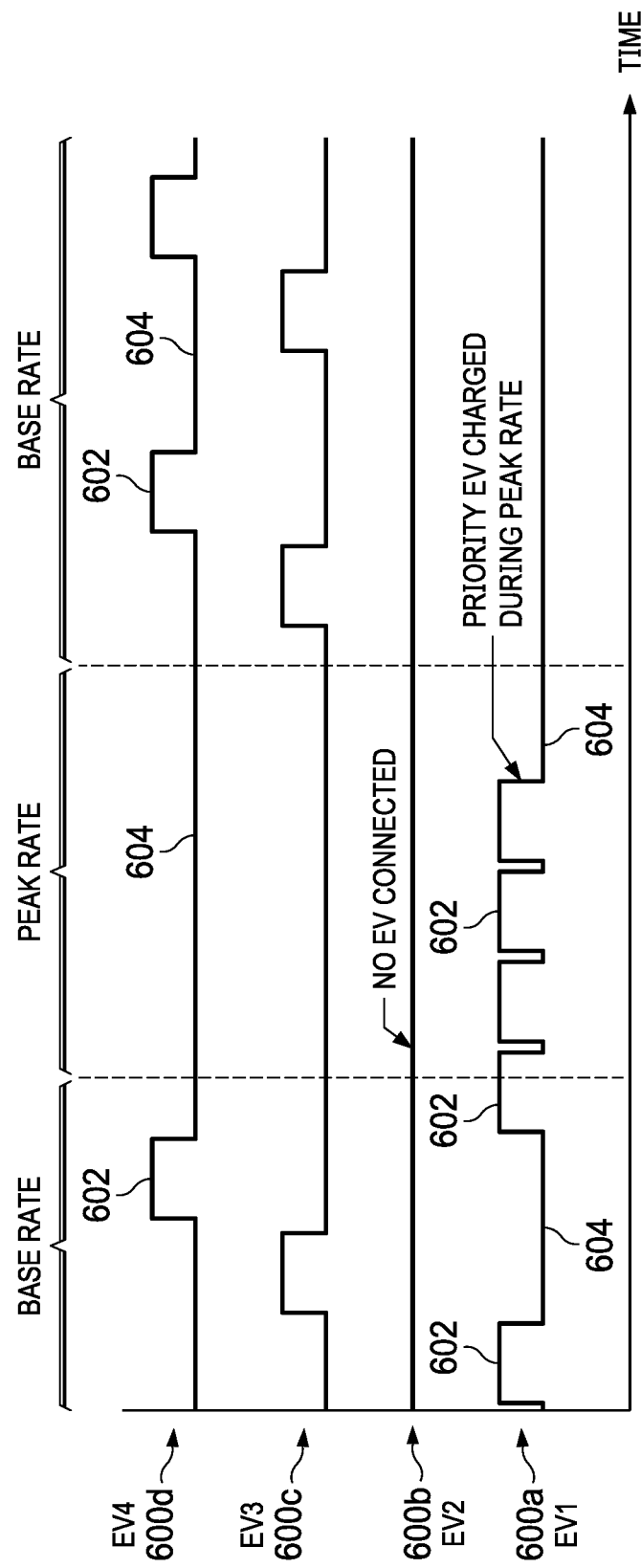
FIG. 6 is a time chart of another example charging scheme for EVs that takes electric power rates into account, according to an embodiment of this disclosure.

FIG. 6 is a time chart of another example charging scheme for EVs that takes electric power rates into account, according to an embodiment of this disclosure. The horizontal axis depicts time elapsed during charging. The vertical axis depicts charging status for each of four EVs, for example, the four EVs 116 of FIG. 1. A first trace 600*a* depicts charging status for EV 1, a second trace 600*b* depicts charging status for EV 2, a third trace 600*c* depicts charging status for EV 3, and a fourth trace 600*d* depicts charging status for EV 4. Charging periods 602 are depicted as higher levels of the traces 600*a* through 600*d*, and non-charging periods 604 are depicted as lower levels of the traces 600*a* through 600*d*. The EVs 1 through 4 are charged by a charging system using a controller, as disclosed in reference to the controller 100 of FIG. 1. In this example, EV 1 has high priority status, EV 2 is not connected to the EV charging equipment 110 of FIG. 1, and EV 3 and EV 4 have standard status. The electric power rates for this example are as shown in FIG. 4. High priority status may be assigned by a user through the user interface 106 of FIG. 1 and transmitted to the instruction processing unit 102 through the user interface module 104 of FIG. 1. In this example, the controller 100 is configured to direct charging current sequentially to each of the standard status EVs 116 during the base rate periods of FIG. 4, and to direct charging current sequentially to each of the high priority status EVs 116 regardless of the electric power rates, until each EV 116 is charged. A charging cessation criterion may be met according to any of the criteria disclosed in reference to FIG. 5. Furthermore, in this example, a charging cessation criterion for an EV having standard status may be met when the electric power rate is above the base rate, or above the threshold rate, for standard status EVs.

The charging cycle in this example may begin with EV 1. Since EV 1 has high priority status, the instruction processing unit 102 transmits a first set of information to the charging interface module 108 to direct charging current to EV 1 for a first prescribed time period, regardless of the electric power rate, while no charging current is directed to the remaining EVs 116, that is, EVs 2 through 4, in this example. After the first prescribed time period expires, a charging cessation criterion is met, and the instruction processing unit 102 transmits a second set of information to the charging interface module 108 to stop the charging current to EV 1. Since the base rate is in effect and EV 2 has standard status, the instruction processing unit 102 transmits a third set of information to the charging interface module 108 to direct charging current to EV 2 for a second prescribed time period, while no charging current is directed to EVs 1, 3, and 4. In this example, EV 2 is not connected to a charging head 114 of FIG. 1 at the time, and the charging interface module 108 transmits information to the instruction processing unit 102 that EV 2 is not connected. Since the base rate is in effect and EV 3 has standard status, the instruction processing unit 102 transmits a fourth set of information to the charging interface module 108 to direct charging current to EV 3 for a third prescribed time period, while no charging current is directed to EVs 1, 2, and 4. After the third prescribed time period expires, a charging cessation criterion is met, and the instruction processing unit 102 transmits a fifth set of information to the charging interface module 108 to stop the charging current to EV 3. Since the base rate is in effect and EV 4 has standard status, the instruction processing unit 102 transmits a sixth set of information to the charging interface module 108 to direct charging current to EV 4 for a fourth prescribed time period, while no charging current is directed to EVs 1, 2, and 3. After the fourth prescribed time period expires, a charging cessation criterion is met, and the instruction processing unit 102 transmits a seventh set of information to the charging interface module 108 to stop the charging current to EV 4.

The cycle begins again with EV 1. Since EV 1 has high priority status, the instruction processing unit 102 transmits information to the charging interface module 108 to direct charging current to EV 1 for the first prescribed time period, regardless of the electric power rate, while no charging current is directed to EVs 2, 3, and 4. While EV 1 is charging, in this example, the electric power rate rises to the peak rate. Because EV 1 has high priority status, charging of EV 1 is continued, regardless of the electric power rate. After the first prescribed time period expires, a charging cessation criterion is met, and the instruction processing unit 102 transmits information to the charging interface module 108 to stop the charging current to EV 1.

At this point, because the electric power rate is at the peak rate and EV 2 has standard status, the instruction processing unit 102 does not initiate charging of EV 2. In this example, EV 2 is not connected, and so would not be charged in any case. Subsequently, because the electric power rate is at the peak rate and EV 3 has standard status, the instruction processing unit 102 does not initiate charging of EV 3. Next, because the electric power rate is at the peak rate and EV 4 has standard status, the instruction processing unit 102 does not initiate charging of EV 4. Thereupon, because the electric power rate is at the peak rate and EV 1 has high priority status, the instruction processing unit 102 transmits information to the charging interface module 108 to direct charging current to EV 1 for the first prescribed time period, while no charging current is directed to EVs 2, 3, and 4. In an alternate version of this example, the instruction processing unit 102 may assess the electric power rate and the status of EVs 2, 3, and 4, and maintain charging of EV 1 without interruption. Charging of the EVs 116 having high priority status, in this example EV 1, continues as disclosed above while the electric power rate is at the peak rate, or is above the threshold rate, as indicated in FIG. 6. EV 1 may be sufficiently charged while the electric power rate is at the peak rate or is above the threshold rate, as indicated in FIG. 6, and so charging to EV 1 is stopped after EV 1 is sufficiently charged. After the electric power rate returns to the base rate, or below the threshold rate, charging of the EVs having standard status is resumed, in sequential order, as disclosed above in this example. In this example, the first through fourth prescribed time periods may all be equal.

FIG. 7 is a time chart of an example charging scheme for EVs that takes EV high priority status into account, according to an embodiment of this disclosure. The horizontal axis depicts time elapsed during charging. The vertical axis depicts charging status for each of four EVs, for example, the four EVs 116 of FIG. 1. A first trace 700a depicts charging status for EV 1, a second trace 700b depicts charging status for EV 2, a third trace 700c depicts charging status for EV 3, and a fourth trace 700d depicts charging status for EV 4. Charging periods 702 are depicted as higher levels of the traces 700a through 700d, and non-charging periods 704 are depicted as lower levels of the traces 700a through 700d. The EVs 1 through 4 are charged by a charging system using a controller, as disclosed in reference to the controller 100 of FIG. 1. In this example, EV 1 is assigned high priority status, EV 2 is not connected to the EV charging equipment 110 of FIG. 1, and EVs 3 and 4 are assigned standard status. High status may be assigned by a user through the user interface 106 of FIG. 1 and transmitted to the instruction processing unit 102 through the user interface module 104 of FIG. 1. A charging cessation criterion may be met according to any of the criteria disclosed in reference to FIG. 3.

In this example, the controller 100 is configured to direct charging current to each of the EVs 116, one at a time, repeatedly, with vehicles having high priority status being charged more frequently than vehicles having standard status, until each EV 116 is charged. In this charging scheme, the instruction processing unit 102 transmits a first set of information to the charging interface module 108 to direct charging current to the EV having high priority status, that is, EV 1, for a high priority time period, while no charging current is directed to the remaining EVs 116, that is, EVs 2 through 4, in this example. After the high priority time period expires, a charging cessation criterion is met, and the instruction processing unit 102 transmits a second set of information to the charging interface module 108 to stop the charging current to EV 1, and subsequently transmits a third set of information to the charging interface module 108 to direct charging current to EV 2, for a standard priority time period, while no charging current is directed to EVs 1, 3, and 4. In this example, EV 2 is not connected to a charging head 114 of FIG. 1 at the time, and the charging interface module 108 transmits information to the instruction processing unit 102 that EV 2 is not connected. The instruction processing unit 102 receives the information from the charging interface module 108 and subsequently transmits a fourth set of information to the charging interface module 108 to direct charging current to the next EV with standard priority, that is, EV 3, for the standard priority time period, while no charging current is directed to EVs 1, 2, and 4. After the standard priority time period expires, a charging cessation criterion is met, and the instruction processing unit 102 transmits a fifth set of information to the charging interface module 108 to stop the charging current to EV 3, and subsequently transmits a sixth set of information to the charging interface module 108 to direct charging current to the EV having high priority status, that is, EV 1, for the high priority time period, while no charging current is directed to EVs 2, 3, and 4. After the high priority time period expires, a charging cessation criterion is met, and the instruction processing unit 102 transmits a seventh set of information to the charging interface module 108 to stop the charging current to EV 1, and subsequently transmits an eighth set of information to the charging interface module 108 to direct charging current to the next EV with standard priority, that is, EV 4, for a standard priority time period, while no charging current is directed to EVs 1, 2, and 3. Charging of the EVs 116 in this charging scheme proceeds in a repetitive manner, alternating between the high priority EV and the next available standard priority EV. The sequential charging cycle of FIG. 7 may be continued until all EVs connected to the EV charging equipment 110 of FIG. 1 are sufficiently charged. This charging scheme may provide for more rapid charging of the high priority EV and thus may be advantageous when the high priority EV is used more than other EVs. In alternate versions of this example, more than one EV 116 may have high priority status.

FIG. 8 is a time chart of an example charging scheme for EVs that takes EV high priority status into account, according to another embodiment of this disclosure. The horizontal axis depicts time elapsed during charging. The vertical axis depicts charging status for each of four EVs, for example, the four EVs 116 of FIG. 1. A first trace 800a depicts charging status for EV 1, a second trace 800b depicts charging status for EV 2, a third trace 800c depicts charging status for EV 3, and a fourth trace 800d depicts charging status for EV 4. Charging periods 802 are depicted as higher levels of the traces 800a through 800d, and non-charging periods 804 are depicted as lower levels of the traces 800a through 800d. The EVs 1 through 4 are charged by a charging system using a controller, as disclosed in reference to the controller 100 of FIG. 1. In this example, EV 1 is assigned high priority status, EV 2 is not connected to the EV charging equipment 110 of FIG. 1, and EVs 3 and 4 are assigned standard status. High status may be assigned by a user through the user interface 106 of FIG. 1 and transmitted to the instruction processing unit 102 through the user interface module 104 of FIG. 1. A charging cessation criterion may be met according to any of the criteria disclosed in reference to FIG. 3. In this example, prescribed charging time periods for high priority status and standard status are different, and the charging cessation criteria for high priority status and standard status correspond to the corresponding prescribed charging time periods.

In this example, the controller 100 is configured to direct charging current to each of the EVs 116, one at a time, repeatedly, with vehicles having high priority status being charged for longer time periods than vehicles having standard status, until each EV 116 is charged. In this charging scheme, the instruction processing unit 102 transmits a first set of information to the charging interface module 108 to direct charging current to the EV having high priority status, that is, EV 1, for a high priority time period, while no charging current is directed to the remaining EVs 116, that is, EVs 2 through 4, in this example. After the high priority time period, a charging cessation criterion is met, and the instruction processing unit 102 transmits a second set of information to the charging interface module 108 to stop the charging current to EV 1, and subsequently transmits a third set of information to the charging interface module 108 to direct charging current to the next EV, that is, EV 2, for a standard priority time period, while no charging current is directed to EVs 1, 3, and 4. In this example, the high priority time period is longer than the standard priority time period. For example, the high priority time period may be 50 percent to 100 percent longer than the standard priority time period. The standard priority time period may be 30 minutes to 60 minutes. For a standard priority time period of 30 minutes, the high priority time period may be 45 minutes to 60 minutes. For a standard priority time period of 60 minutes, the high priority time period may be 90 minutes to 120 minutes, by way of example. In this example, EV 2 is not connected to a charging head 114 of FIG. 1 at the time, and the charging interface module 108 transmits to the instruction processing unit 102 that EV 2 is not connected. The instruction processing unit 102 receives the information from the charging interface module 108 and subsequently transmits a fourth set of information to the charging interface module 108 to direct charging current to the next EV, that is, EV 3, for the standard priority time period, while no charging current is directed to EVs 1, 2, and 4. After the standard priority time period, a charging cessation criterion is met, and the instruction processing unit 102 transmits a fifth set of information to the charging interface module 108 to stop the charging current to EV 3, and subsequently transmits a sixth set of information to the charging interface module 108 to direct charging current to the next EV, that is, EV 4, for a standard priority time period, while no charging current is directed to EVs 1, 2, and 3. Charging of the EVs 116 in this charging scheme proceeds in a repetitive manner, sequentially through all the available EVs, in order. The sequential charging cycle of FIG. 8 may be continued until all EVs connected to the EV charging equipment 110 of FIG. 1 are sufficiently charged. This charging scheme may provide for more rapid charging of the high priority EV and thus may be advantageous when the high priority EV is used more than other EVs. In alternate versions of this example, more than one EV 116 may have high priority status.

Figure 9:
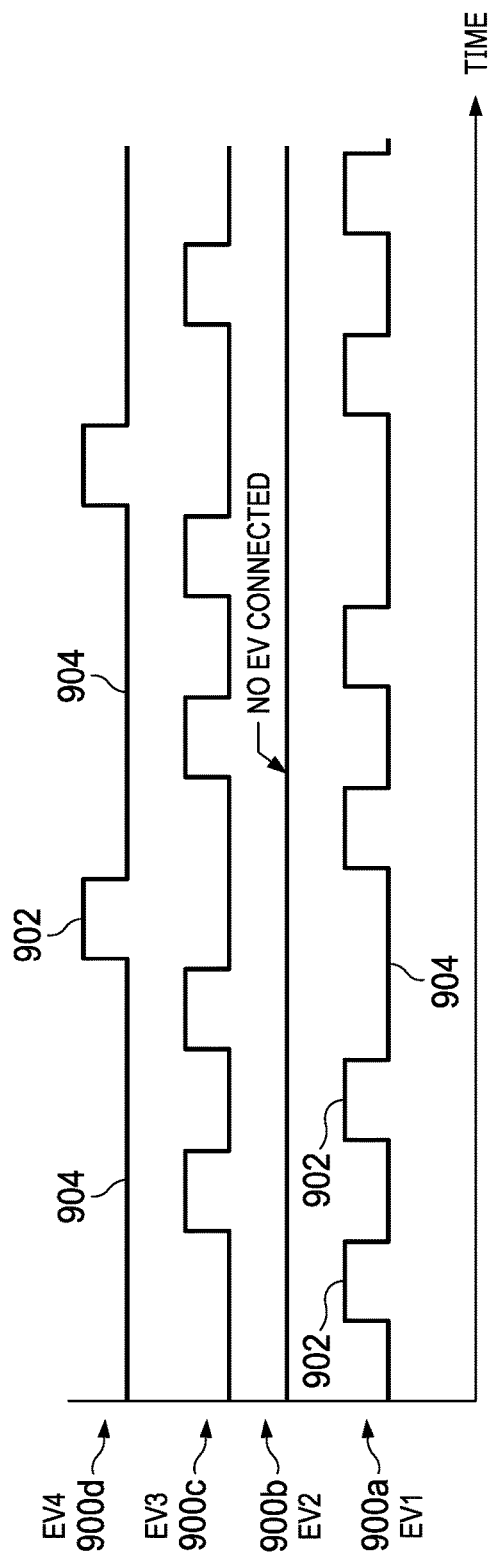
FIG. 9 is a time chart of an example charging scheme for EVs that takes EV low priority status into account, according to an embodiment of this disclosure.

FIG. 9 is a time chart of an example charging scheme for EVs that takes EV low priority status into account, according to an embodiment of this disclosure. The horizontal axis depicts time elapsed during charging. The vertical axis depicts charging status for each of four EVs, for example, the four EVs 116 of FIG. 1. A first trace 900a depicts charging status for EV 1, a second trace 900b depicts charging status for EV 2, a third trace 900c depicts charging status for EV 3, and a fourth trace 900d depicts charging status for EV 4. Charging periods 902 are depicted as higher levels of the traces 900a through 900d, and non-charging periods 904 are depicted as lower levels of the traces 900a through 900d. The EVs 1 through 4 are charged by a charging system using a controller, as disclosed in reference to the controller 100 of FIG. 1. In this example, EVs 1 and 3 are assigned standard priority status, EV 2 is not connected to the EV charging equipment 110 of FIG. 1, and EV 4 is assigned low priority status. Low priority status may be assigned by a user through the user interface 106 of FIG. 1 and transmitted to the instruction processing unit 102 through the user interface module 104 of FIG. 1. A charging cessation criterion may be met according to any of the criteria disclosed in reference to FIG. 3.

In this example, the controller 100 is configured to direct charging current to each of the EVs 116, one at a time, repeatedly, with vehicles having low priority status being charged less frequently than vehicles having standard status, until each EV 116 is charged. This may be accomplished by a two charging cycle scheme of sequentially charging all the available EVs having standard priority status in a first charging cycle, followed by sequentially charging all the available EVs, including the EVs having low priority status, in a second charging cycle. In this charging scheme, the first charging cycle begins with the instruction processing unit 102 transmitting a first set of information to the charging interface module 108 to direct charging current to the first EV having standard priority status, that is, EV 1, for a standard priority time period, while no charging current is directed to the remaining EVs 116, that is, EVs 2 through 4, in this example. After the standard priority time period, a charging cessation criterion is met, and the instruction processing unit 102 transmits a second set of information to the charging interface module 108 to stop the charging current to EV 1, and subsequently transmits a third set of information to the charging interface module 108 to direct charging current to the next EV with standard priority, that is, EV 2, for a standard priority time period, while no charging current is directed to EVs 1, 3, and 4. In this example, EV 2 is not connected to a charging head 114 of FIG. 1 at the time, and the charging interface module 108 transmits to the instruction processing unit 102 that EV 2 is not connected. The instruction processing unit 102 receives the information from the charging interface module 108 and subsequently transmits a fourth set of information to the charging interface module 108 to direct charging current to the next EV with standard priority, that is, EV 3, for the standard priority time period, while no charging current is directed to EVs 1, 2, and 4. After the standard priority time period, a charging cessation criterion is met, and the instruction processing unit 102 transmits a fifth set of information to the charging interface module 108 to stop the charging current to EV 3. In this example, there are no more EVs having standard priority status, completing the first charging cycle.

The second charging cycle begins with the instruction processing unit 102 transmitting a sixth set of information to the charging interface module 108 to direct charging current to the first EV, that is, EV 1, for a standard priority time period, while no charging current is directed to the remaining EVs 116, that is, EVs 2 through 4, in this example. After the standard priority time period, a charging cessation criterion is met, and the instruction processing unit 102 transmits a seventh set of information to the charging interface module 108 to stop the charging current to EV 1, and subsequently transmits an eighth set of information to the charging interface module 108 to direct charging current to the next EV, that is, EV 2, for a standard priority time period. Because EV 2 is not connected to a charging head 114 of FIG. 1 at the time, and the charging interface module 108 transmits information to the instruction processing unit 102 that EV 2 is not connected. The instruction processing unit 102 receives the information from the charging interface module 108 and subsequently transmits a ninth set of information to the charging interface module 108 to direct charging current to the next EV, that is, EV 3, for the standard priority time period, while no charging current is directed to EVs 1, 2, and 4. After the standard priority time period, a charging cessation criterion is met, and the instruction processing unit 102 transmits a tenth set of information to the charging interface module 108 to stop the charging current to EV 3, and subsequently transmits an eleventh set of information to the charging interface module 108 to direct charging current to the next EV, that is, EV 4, for the low priority time period, while no charging current is directed to EVs 1, 2, and 3. After the low priority time period, a charging cessation criterion is met, and the instruction processing unit 102 transmits a twelfth set of information to the charging interface module 108 to stop the charging current to EV 4, completing the second charging cycle. In this example, the standard priority time period and the low priority time period may be equal, and may be 20 minutes to 60 minutes, by way of example.

Charging of the EVs 116 in this two charging cycle scheme proceeds in a repetitive manner, executing the first charging cycle, followed by the second charging cycle. The sequential charging cycle of FIG. 9 may be continued until all EVs connected to the EV charging equipment 110 of FIG. 1 are sufficiently charged. This charging scheme may provide for more rapid charging of the standard priority EVs and eventual charging of the low priority EVs, and thus may be advantageous when the low priority EV is used less than other EVs. In alternate versions of this example, more than one EV 116 may have low priority status.

Figure 10:
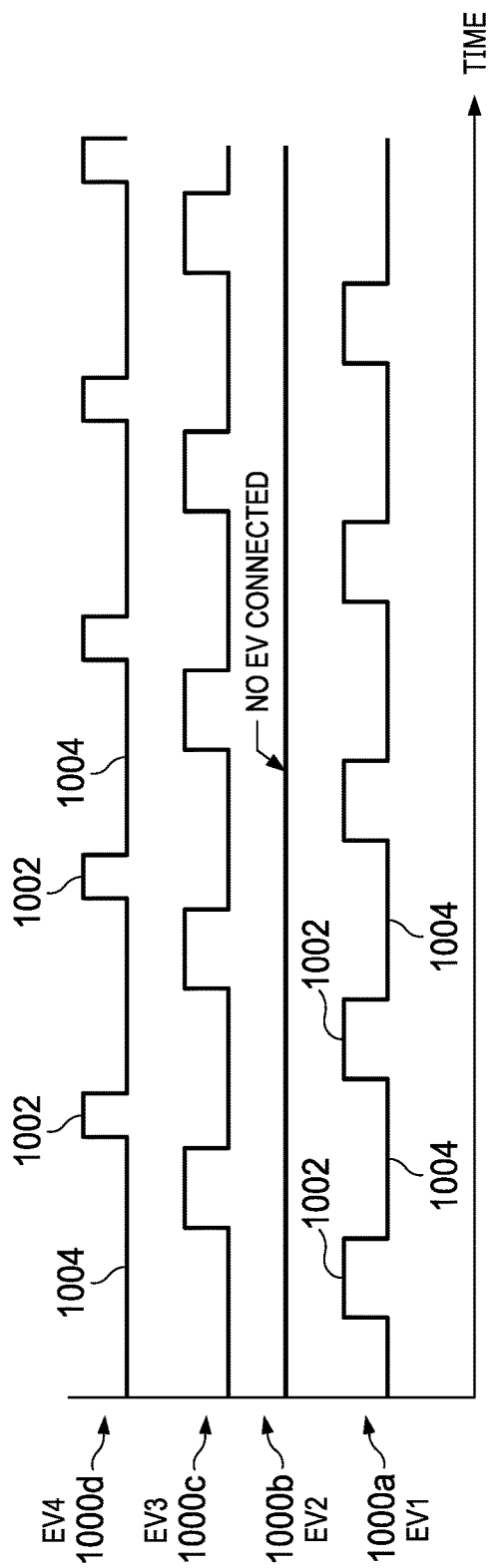
FIG. 10 is a time chart of another example charging scheme for EVs that takes EV priority status into account, according to another embodiment of this disclosure.

FIG. 10 is a time chart of another example charging scheme for EVs that takes EV low priority status into account, according to another embodiment of this disclosure. The horizontal axis depicts time elapsed during charging. The vertical axis depicts charging status for each of four EVs, for example, the four EVs 116 of FIG. 1. A first trace 1000a depicts charging status for EV 1, a second trace 1000b depicts charging status for EV 2, a third trace 1000c depicts charging status for EV 3, and a fourth trace 1000d depicts charging status for EV 4. Charging periods 1002 are depicted as higher levels of the traces 1000a through 1000d, and non-charging periods 1004 are depicted as lower levels of the traces 1000a through 1000d. The EVs 1 through 4 are charged by a charging system using a controller, as disclosed in reference to the controller 100 of FIG. 1. In this example, EVs 1 and 3 are assigned standard priority status, EV 2 is not connected to the EV charging equipment 110 of FIG. 1, and EV 4 is assigned low status. Low status may be assigned by a user through the user interface 106 of FIG. 1 and transmitted to the instruction processing unit 102 through the user interface module 104 of FIG. 1. A charging cessation criterion may be met according to any of the criteria disclosed in reference to FIG. 3. In this example, prescribed charging time periods for low priority status and standard status are different, and the charging cessation criteria for low priority status and standard status correspond to the corresponding prescribed charging time periods.

In this example, the controller 100 is configured to direct charging current to each of the EVs 116, one at a time, repeatedly, with vehicles having low priority status being charged for shorter time periods than vehicles having standard status, until each EV 116 is charged. In this charging scheme, the instruction processing unit 102 transmits a first set of information to the charging interface module 108 to direct charging current to the first EV, that is, EV 1, which has standard priority status, for a standard priority time period, while no charging current is directed to the remaining EVs 116, that is, EVs 2 through 4, in this example. After the standard priority time period, a charging cessation criterion is met, and the instruction processing unit 102 transmits a second set of information to the charging interface module 108 to stop the charging current to EV 1, and subsequently transmits a third set of information to the charging interface module 108 to direct charging current to the next EV, that is, EV 2. In this example, EV 2 is not connected to a charging head 114 of FIG. 1 at the time, and the charging interface module 108 transmits information to the instruction processing unit 102 that EV 2 is not connected. The instruction processing unit 102 receives the information from the charging interface module 108 and subsequently transmits a fourth set of information to the charging interface module 108 to direct charging current to the next EV, that is, EV 3, which has standard priority status, for the standard priority time period, while no charging current is directed to EVs 1, 2, and 4. After the standard priority time period, a charging cessation criterion is met, and the instruction processing unit 102 transmits a fifth set of information to the charging interface module 108 to stop the charging current to EV 3, and subsequently transmits a sixth set of information to the charging interface module 108 to direct charging current to the next EV, that is, EV 4, which has low priority status, for a low priority time period, while no charging current is directed to EVs 1, 2, and 3. After the low priority time period, a charging cessation criterion is met, and the instruction processing unit 102 transmits a seventh set of information to the charging interface module 108 to stop the charging current to EV 4.

In this example, the high priority time period is longer than the standard priority time period. For example, the high priority time period may be 50 percent to 100 percent longer than the standard priority time period. The standard priority time period may be 30 minutes to 60 minutes. For a standard priority time period of 30 minutes, the high priority time period may be 45 minutes to 60 minutes. For a standard priority time period of 60 minutes, the high priority time period may be 90 minutes to 120 minutes, by way of example. Charging of the EVs 116 in this charging scheme proceeds in a repetitive manner, sequentially through all the available EVs, in order. The sequential charging cycle of FIG. 10 may be continued until all EVs connected to the EV charging equipment 110 of FIG. 1 are sufficiently charged. This charging scheme may provide for more rapid charging of the standard priority EVs and eventual charging of the low priority EVs, and thus may be advantageous when the low priority EV is used less than other EVs. In alternate versions of this example, more than one EV 116 may have low priority status.

Figure 11:
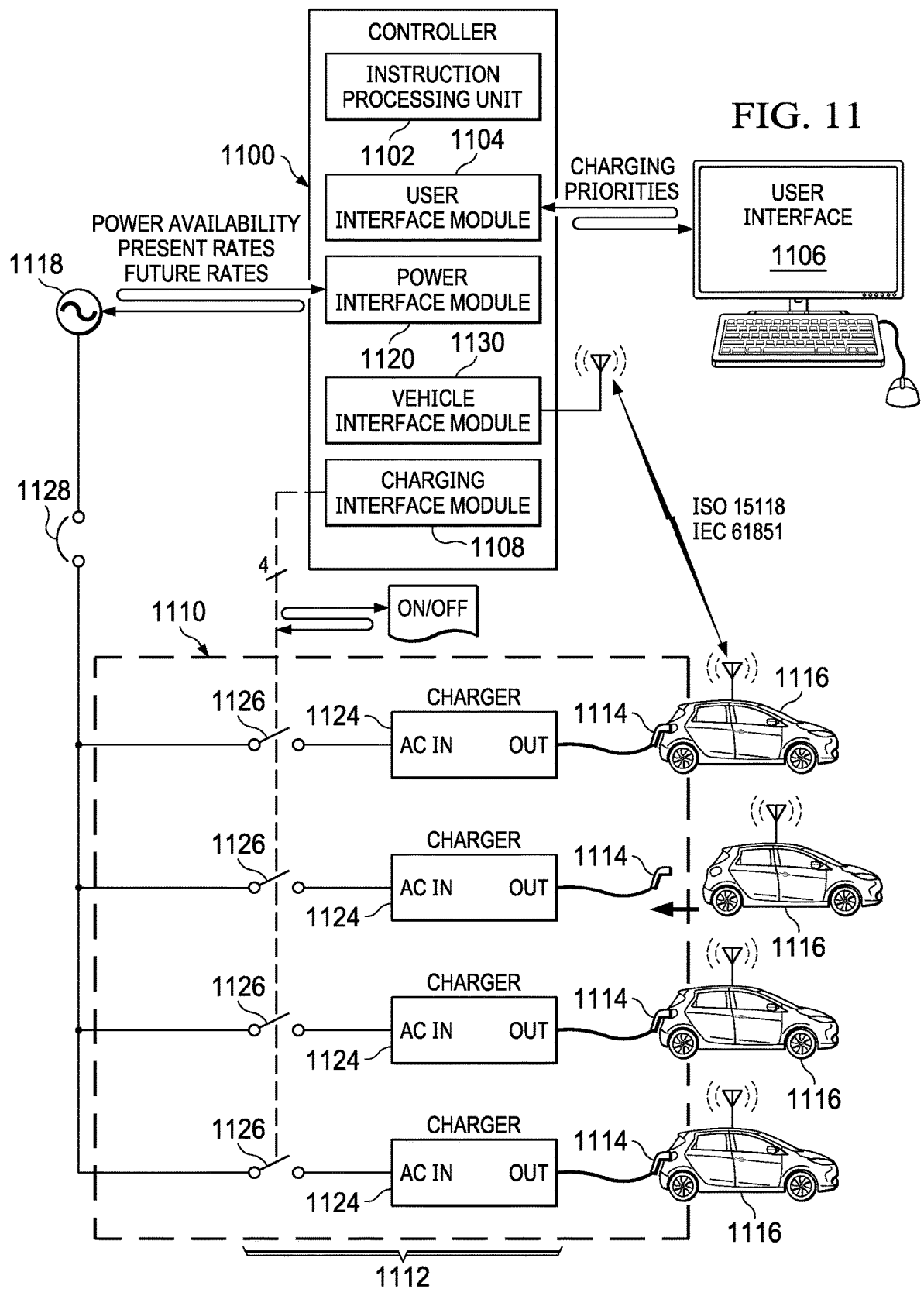
FIG. 11 is a schematic diagram of an example EV charging configuration having a controller, EV charging equipment with elementary chargers, and EVs.

FIG. 11 is a schematic diagram of an example EV charging configuration having a controller, EV charging equipment with elementary chargers, and EVs. The controller 1100 includes an instruction processing unit 1102, a user interface module 1104 coupled to a user interface 1106, and a charging interface module 1108 coupled to EV charging equipment 1110. The instruction processing unit 1102 is configured to transmit information to the user interface module 1104, and to receive information from the user interface module 1104. The instruction processing unit 1102 is configured to transmit information to the charging interface module 1108; the instruction processing unit 1102 may optionally be configured to receive information from the charging interface module 1108.

In this example, the EV charging equipment 1110 includes elementary chargers 1124, power relays 1126, and charging heads 1114. The elementary chargers 1124 combined with the power relays 1126 provide a power management apparatus 1112. The power relays 1126 couple a power source 1118 to the chargers 1124. In an alternate version of this example, the power relays 1126 may be relocated between the elementary chargers 1124 and the charging heads 1114. The power source 1118 may be an AC power source from a utility provider. The power source 1118 may be coupled to the power relays 1126 through a current limiting component 1128, such as a conventional circuit breaker or a smart circuit breaker that is configured to communicate with users, as indicated in FIG. 11. In this example, the controller 1100 may include a power interface module 1120 configured to receive information from the power source 1118 and transmit information to the power source 1118. The instruction processing unit 1102 is configured to transmit information to the power interface module 1120 and to receive information from the power interface module 1120.

The information from the instruction processing unit 1102 to the power interface module 1120 may include queries regarding a current limit or available power from the power source 1118, or present and/or future electric power price rates. The information from the power interface module 1120 to the power source 1118 may include the information from the instruction processing unit 1102, reformatted to be compatible with the power source 1118.

The information from the power source 1118 to the power interface module 1120 may include the current limit, the available power, the present electric power price rates, or the future electric power price rates. The information from the power interface module 1120 to the instruction processing unit 1102 may include the information from the power source 1118, reformatted to be compatible with the instruction processing unit 1102.

The chargers 1124 of this example may be implemented as elementary chargers, that is, chargers with no capabilities to communicate with the EV being charged, other than providing charging current. In one version of this example, the chargers 1124 may provide AC power to the charging heads 1114. The AC power from the chargers 1124 may have essentially the same voltage as the AC power from the power source 1118, or the chargers 1124 may include a transformer to provide the AC power with a higher voltage to increase charging speeds. In another version of this example, the chargers 1124 may include rectifiers and optionally voltage regulators, and may provide DC power to the charging heads 1114.

The charging heads 1114 are connected to EVs 1116. The charging heads 1114 may be implemented as Society of Automotive Engineers Combined Charging System (SAE CCS) charging heads, SAE-J1772 charging heads, or may be implemented as custom charging heads. In alternate versions of this example, the charging heads 1114 may be implemented as wireless charging heads, and may be connected to the EVs 1116 inductively or capacitively.

The controller 1100 is configured to operate the EV charging equipment 1110 to direct charging current to the EVs 1116. The instruction processing unit 1102 is configured to transmit information to the charging interface module 1108 designed to cause the EV charging equipment 1110 to direct charging current to the EVs 1116, one at a time. The charging interface module 1108 is configured to receive the information from the instruction processing unit 1102 and transmit information to the EV charging equipment 1110 designed to cause one of the power relays 1126 to close at a time, enabling charging current to flow from the power source 1118 through the closed relay 1126, through the charger 1124 connected to the closed relay 1126, through the corresponding charging head 1114 to the corresponding EV 1116. In this example, the information from the charging interface module 1108 to the EV charging equipment 1110, designed to cause one of the power relays 1126 to close, may include an ON signal to the power relay 1126 to be closed.

The instruction processing unit 1102 is further configured to transmit information to the charging interface module 1108 designed to cause the EV charging equipment 1110 to stop the charging current to the EV 1116 being charged, prior to directing charging current to another EV 1116. The controller 1100 and the EV charging equipment 1110 may be configured to charge the EVs 1116 according to any of the example charging schemes disclosed in reference to FIG. 2, FIG. 3, and FIG. 5 through FIG. 10.

The controller 1100 of this example may include a vehicle interface module 1130 configured to communicate with the EVs 1116. The instruction processing unit 1102 is configured to transmit information to, and receive information from, the vehicle interface module 1130. The vehicle interface module 1130 is configured to transmit information to, and receive information from, the EVs 1116. The vehicle interface module 1130 may communicate with the EVs 1116 wirelessly, using the ISO 15118 or IEC 61851 protocols, for example, as indicated in FIG. 11.

The information from the instruction processing unit 1102 to the vehicle interface module 1130 may include queries regarding vehicle identification, charging capacities of batteries in the EVs 1116, percentages of the charging capacities presently attained, or charging current limits. The information from the vehicle interface module 1130 to the EVs 1116 may include the information from the instruction processing unit 1102, reformatted to be compatible with the EVs 1116.

The information from the EVs 1116 to the vehicle interface module 1130 may include the vehicle identification, the charging capacities, the percentages of the charging capacities presently attained, or the charging current limits. The information from the vehicle interface module 1130 to the instruction processing unit 1102 may include the information from the EVs 1116, reformatted to be compatible with the instruction processing unit 1102.

The example EV charging configuration of FIG. 11 may advantageously enable efficient charging of the EVs 1116 using the elementary chargers 1124, without operator intervention. Using the elementary chargers 1124 combined with the power relays 1126, which may be less expensive than EVSE stations, may enable a lower investment cost than other charging facilities.

Figure 12:
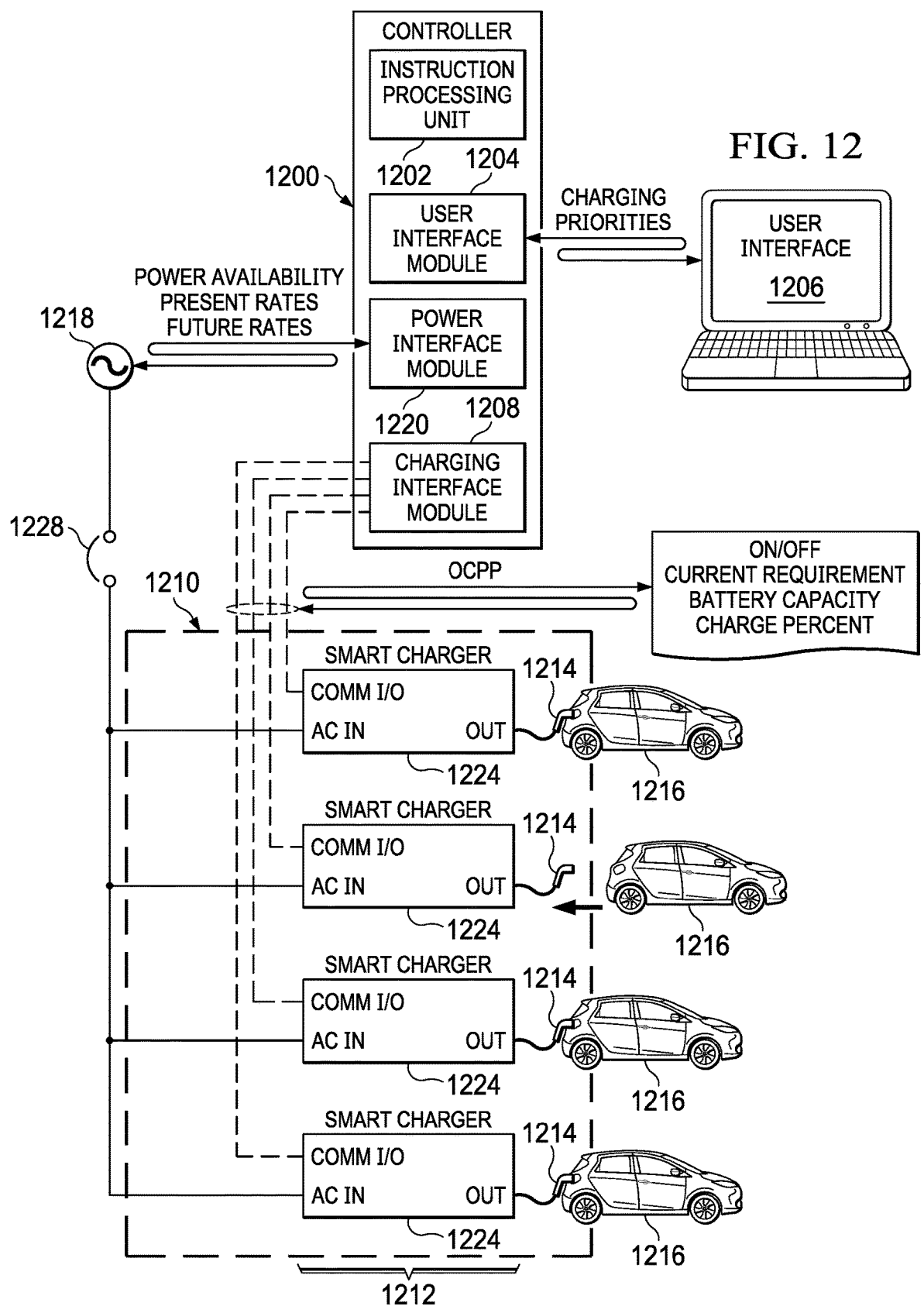
FIG. 12 is a schematic diagram of an example EV charging configuration having a controller, EV charging equipment with electric vehicle service equipment (EVSE) stations, and EVs.

FIG. 12 is a schematic diagram of an example EV charging configuration having a controller, EV charging equipment with EVSE stations, and EVs. The controller 1200 includes an instruction processing unit 1202, a user interface module 1204 coupled to a user interface 1206, and a charging interface module 1208 coupled to EV charging equipment 1210. The instruction processing unit 1202 is configured to transmit information to the user interface module 1204, and to receive information from the user interface module 1204. The instruction processing unit 1202 is configured to transmit information to the charging interface module 1208; the instruction processing unit 1202 may optionally be configured to receive information from the charging interface module 1208.

In this example, the EV charging equipment 1210 includes EVSE stations 1224 with charging heads 1214. The EVSE stations 1224 collectively provide a power management apparatus 1212. The EVSE stations 1224 are coupled to a power source 1218, which may be an AC power source from a utility provider. The power source 1218 may be coupled to the EVSE stations 1224 through a current limiting component 1228, such as a conventional circuit breaker or a smart circuit breaker. The charging heads 1214 may be implemented as any of the examples disclosed in reference to the charging heads 1114 of FIG. 11. Each charger 1224 is configured to receive information through an input/output communication port, labeled "COMM I/O" in FIG. 12, to start and stop the charging current.

In this example, the controller 1200 may include a power interface module 1220 configured to receive information from the power source 1218 and transmit information to the power source 1218. The instruction processing unit 1202 is configured to transmit information to the power interface module 1220 and to receive information from the power interface module 1220. Information transfer between the instruction processing unit 1202 and the power interface module 1220, and between the power interface module 1220 and the power source 1218 may be as disclosed in reference to the instruction processing unit 1102, the power interface module 1120, and the power source 1118 of FIG. 11.

The chargers 1224 of this example may be implemented as EVSE stations, that is, chargers configured to communicate with EVs 1216. The chargers 1224 may provide AC power or DC power to the charging heads 1214. The charging interface module 1208 is configured to communicate with the chargers 1224, using the Open Charge Point Protocol (OCPP), for example. The chargers 1224 are configured to transmit information to, and receive information from, the EVs 1216.

The information from the instruction processing unit 1202 to the chargers 1224, through the charging interface module 1208, may include queries regarding vehicle identification, preferred charging voltage and current mode (AC or DC), queries regarding charging capacities of batteries in the EVs 1216, percentages of the charging capacities presently attained, or charging current limits, reformatted at each stage for compatibility with the receiving component. The information from the chargers 1224 to the instruction processing unit 1202, through the charging interface module 1208, may include responses to the queries, also reformatted at each stage.

The controller 1200 is configured to operate the EV charging equipment 1210 to direct charging current to the EVs 1216. The instruction processing unit 1202 is configured to transmit information to the charging interface module 1208 designed to cause the EV charging equipment 1210 to direct charging current to the EVs 1216, one at a time. The charging interface module 1208 is configured to receive the information from the instruction processing unit 1202 and transmit information to the EV charging equipment 1210 designed to cause one of the EVSE stations 1224 to direct charging current to flow from the power source 1218 through the corresponding charging head 1214 to the selected EV 1216. In this example, the information from the charging interface module 1208 to the EV charging equipment 1210, designed to direct charging current to the selected EV 1216, may include an ON instruction to a selected charger 1224. The instruction processing unit 1202 is further configured to transmit information to the charging interface module 1208 designed to cause the EV charging equipment 1210 to stop the charging current to the EV 1216 being charged, prior to directing charging current to another EV 1216. The controller 1200 and the EV charging equipment 1210 may be configured to charge the EVs 1216 according to any of the example charging schemes disclosed in reference to FIG. 2, FIG. 3, and FIG. 5 through FIG. 10.

The example EV charging configuration of FIG. 12 may advantageously enable efficient charging of the EVs 1216 using the EVSE stations 1224, without operator intervention. Using the EVSE stations 1224 may enable more rapid charging than other charging facilities, due to the EVSE stations 1224 adjusting charging voltage and current for each EV 1216 as needed to meet that EV's 1216 optimum charging profile.

Figure 13:
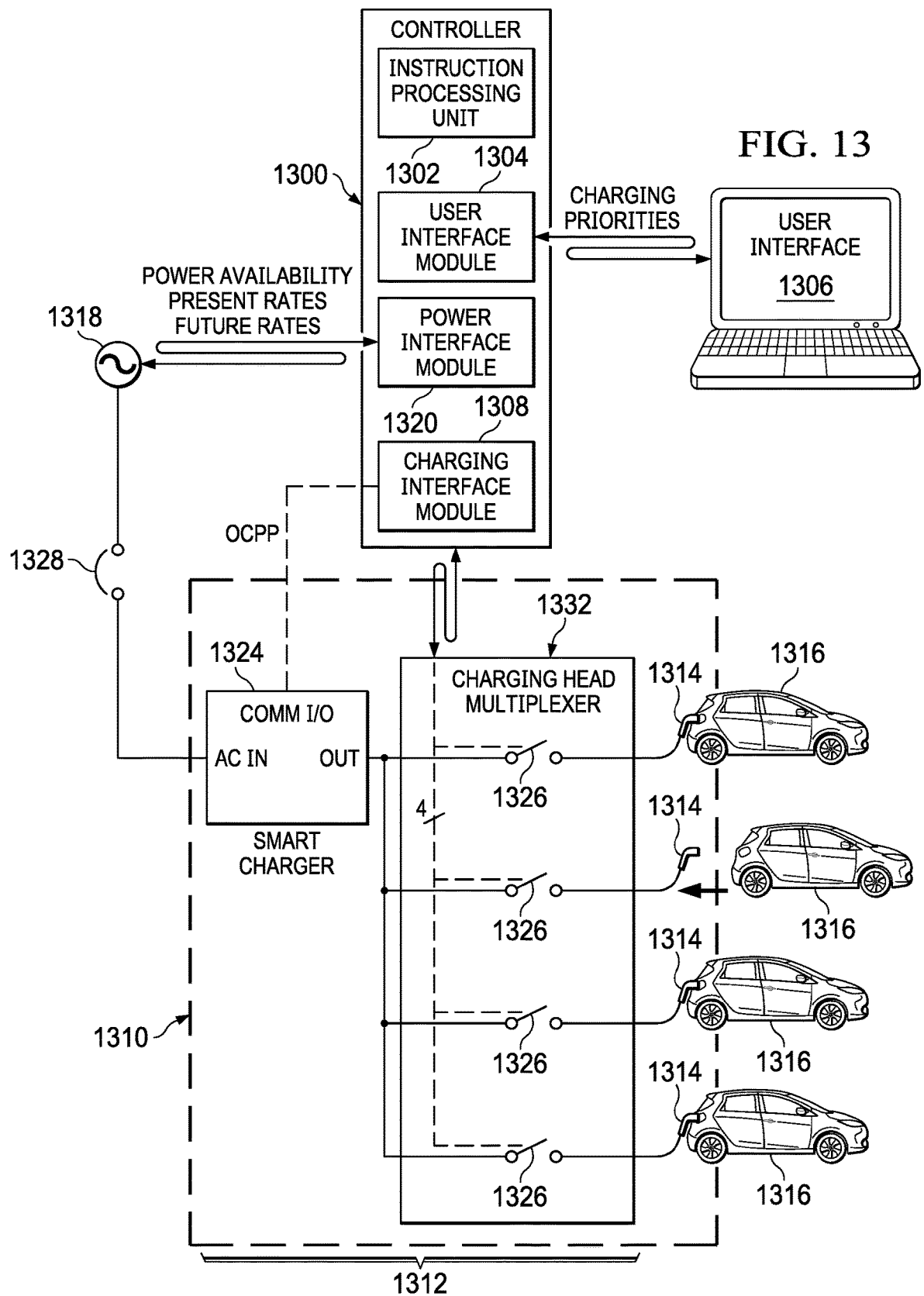
FIG. 13 is a schematic diagram of another example EV charging configuration having a controller, EV charging equipment with EVSE stations, and EVs.

FIG. 13 is a schematic diagram of another example EV charging configuration having a controller, EV charging equipment with a single EVSE station, a charging head multiplexer with charging heads, and EVs. The controller 1300 includes an instruction processing unit 1302, a user interface module 1304 coupled to a user interface 1306, and a charging interface module 1308 coupled to EV charging equipment 1310. The instruction processing unit 1302 is configured to transmit information to the user interface module 1304, and to receive information from the user interface module 1304. The instruction processing unit 1302 is configured to transmit information to the charging interface module 1308; the instruction processing unit 1302 may optionally be configured to receive information from the charging interface module 1308.

In this example, the EV charging equipment 1310 includes a single EVSE station 1324 connected to a charging head multiplexer 1332, with charging heads 1314 connected to the charging head multiplexer 1332. The EVSE station 1324 combined with the charging head multiplexer 1332 provides a power management apparatus 1312. The EVSE station 1324 is coupled to a power source 1318, which may be an AC power source from a utility provider. The power source 1318 may be coupled to the EVSE station 1324 through a current limiting component 1328, such as a conventional circuit breaker or a smart circuit breaker. The EVSE station 1324 is configured to receive information through an input/output communication port, labeled "COMM I/O" in FIG. 13, to allocate the charging current. EVs 1316 are connected to the charging heads 1314. The charging head multiplexer 1332 is configured to direct charging current from the EVSE station 1324 to the EVs 1316, one at a time. The charging head multiplexer 1332 is also configured to relay information between the EVSE station 1324 and the EVs 1316. The charging head multiplexer 1332 may include charging cable relays 1326 connecting the EVSE station 1324 is to each charging heads 1314, as depicted in FIG. 13. The charging heads 1314 may be implemented as any of the examples disclosed in reference to the charging heads 1114 of FIG. 11. In an alternate version of this example, the EVSE station 1324 may be replaced by an elementary charger.

In this example, the controller 1300 may include a power interface module 1320 configured to receive information from the power source 1318 and transmit information to the power source 1318. The instruction processing unit 1302, the power interface module 1320 and the power source 1318 are configured to exchange information, for example as disclosed in reference to the instruction processing unit 1102, the power interface module 1120, and the power source 1118 of FIG. 11.

The charging interface module 1308 of this example is configured to communicate with the EVSE station 1324. The charging interface module 1308 may communicate with the EVSE station 1324 using the OCPP, for example. The instruction processing unit 1302 is configured to transmit information to, and receive information from, the charging interface module 1308. The charging interface module 1308 is configured to transmit information to, and receive information from, the EVSE station 1324. The EVSE station 1324 is configured to transmit information to, and receive information from, the charging interface module 1308. The charging head multiplexer 1332 may be configured to exchange information with the EVs 1316 and the EVSE station 1324. In some versions of this example, the charging head multiplexer 1332 may be configured to simply relay information between the EVSE station 1324 and the EVs 1316. The information from the instruction processing unit 1302 to the EVs 1316 may include queries regarding vehicle identification, preferred charging voltage and current mode (AC or DC), queries regarding charging capacities of batteries in the EVs 1316, percentages of the charging capacities presently attained, or charging current limits, reformatted at each stage for compatibility with the receiving component. The information from the EVs 1316 to the instruction processing unit 1302 may include responses to the queries, also reformatted at each stage.

The controller 1300 is configured to operate the EV charging equipment 1310 to direct charging current to the EVs 1316. The instruction processing unit 1302 is configured to transmit information to the charging interface module 1308 designed to cause the EV charging equipment 1310 to direct charging current to the EVs 1316, one at a time, through the charging head multiplexer 1332.

The charging interface module 1308 is configured to receive the information from the instruction processing unit 1302 and transmit information to the charging head multiplexer 1332 designed to cause the charging head multiplexer 1332 to connect the EVSE station 1324 to one EV 1316 at a time, and transmit information to the EVSE station 1324 to start the charging current, enabling the charging current to flow from the power source 1318 through the EVSE station 1324, through the charging head multiplexer 1332, through the corresponding charging head 1314 to the selected EV 1316. In this example, the information from the charging interface module 1308 to the EVSE station 1324, designed to cause the EVSE station 1324 to start the charging current, may include an ON instruction to the EVSE station 1324. In this example, the information from the charging interface module 1308 to the charging head multiplexer 1332 may include identification of a selected charging head 1314.

The instruction processing unit 1302 is further configured to transmit information to the charging interface module 1308 designed to cause the EV charging equipment 1310 and the EVSE station 1324 to stop the charging current to the EV 1316 being charged, prior to directing charging current to another EV 1316. The controller 1300 and the EV charging equipment 1310 may be configured to charge the EVs 1316 according to any of the example charging schemes disclosed in reference to FIG. 2, FIG. 3, and FIG. 5 through FIG. 10.

The example EV charging configuration of FIG. 13 may advantageously enable efficient charging of the EVs 1316 using the single EVSE station 1324 combined with the charging head multiplexer 1332, without operator intervention. Using the single EVSE stations 1324 combined with the charging head multiplexer 1332 may enable more rapid charging than other charging facilities, due to the advantages accrued by using the EVSE station 1324, at a lower equipment cost compared to using multiple independent EVSE stations.

Figure 14:
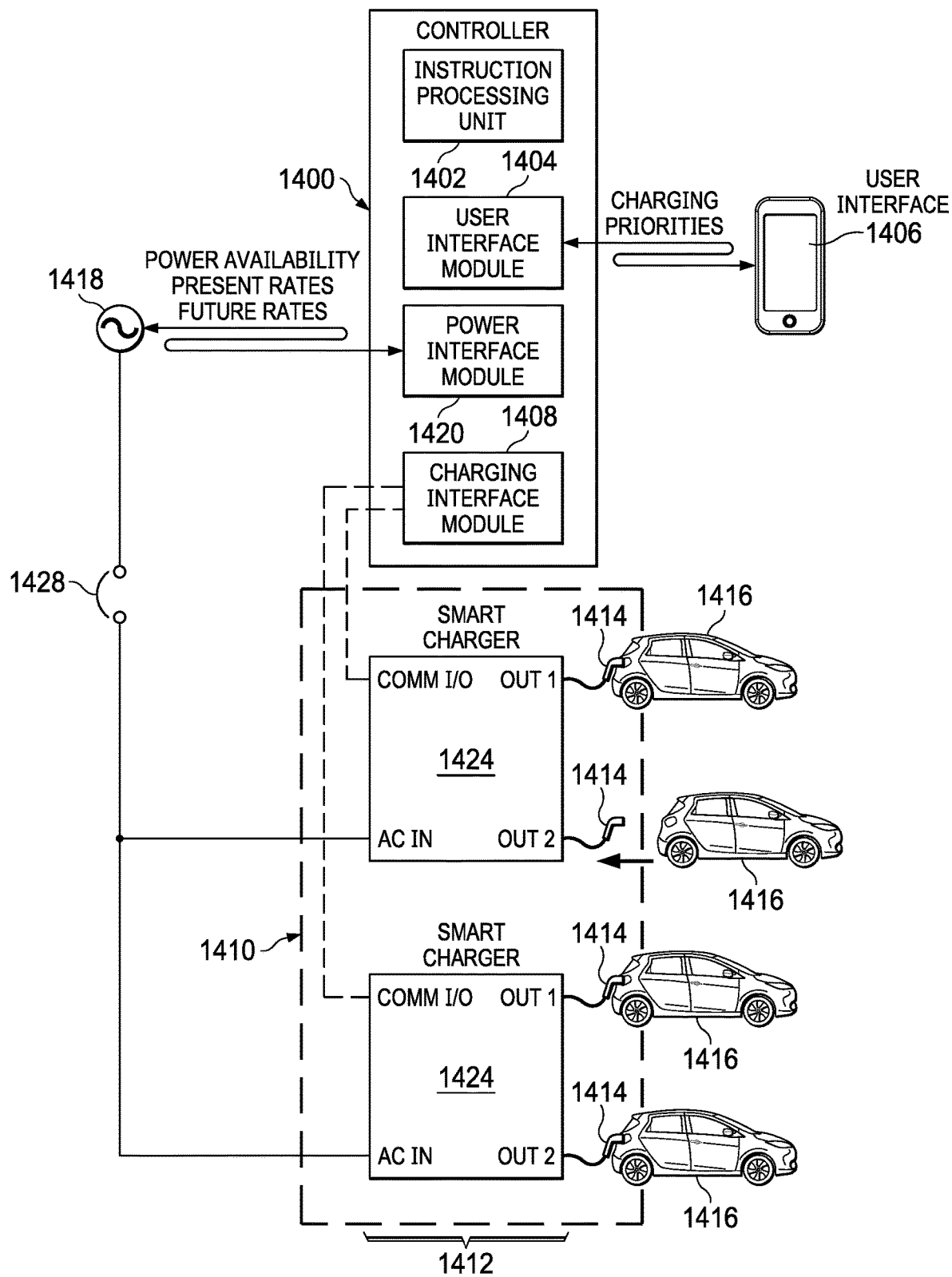
FIG. 14 is a schematic diagram of an example EV charging configuration having a controller, EV charging equipment with multi-head EVSE stations, and EVs.

FIG. 14 is a schematic diagram of an example EV charging configuration having a controller, EV charging equipment with multi-head EVSE stations, and EVs. The controller 1400 includes an instruction processing unit 1402, a user interface module 1404 coupled to a user interface 1406, and a charging interface module 1408 coupled to EV charging equipment 1410. The instruction processing unit 1402 is configured to transmit information to the user interface module 1404, and to receive information from the user interface module 1404. The instruction processing unit 1402 is configured to transmit information to the charging interface module 1408; the instruction processing unit 1402 may optionally be configured to receive information from the charging interface module 1408.

In this example, the EV charging equipment 1410 includes a plurality of EVSE stations 1424, each with a plurality of charging heads 1414. The EVSE stations 1424 collectively provide a power management apparatus 1412. The EVSE stations 1424 are coupled to a power source 1418, which may be an AC power source from a utility provider. The power source 1418 may be coupled to the EVSE stations 1424 through a current limiting component 1428, such as a conventional circuit breaker or a smart circuit breaker. The charging heads 1414 may be implemented as any of the examples disclosed in reference to the charging heads 1114 of FIG. 11.

In this example, the controller 1400 may include a power interface module 1420 configured to receive information from the power source 1418 and transmit information to the power source 1418. The instruction processing unit 1402 is configured to transmit information to the power interface module 1420 and to receive information from the power interface module 1420. Information transfer between the instruction processing unit 1402 and the power interface module 1420, and between the power interface module 1420 and the power source 1418 may be as disclosed in reference to the instruction processing unit 1102, the power interface module 1120, and the power source 1118 of FIG. 11.

The chargers 1424 of this example may be implemented as EVSE stations, that is, chargers configured to communicate with EVs 1416, through the charging heads 1414, for example. The chargers 1424 may provide AC power or DC power to the charging heads 1414. Each charger 1424 may be configured to provide charging current one or more of the plurality of charging heads 1414 connected to the charger 1424, and is configured to receive information through an input/output communication port, labeled "COMM I/O" in FIG. 14, to allocate the charging current to a single selected charging head 1414 or any set of the plurality of charging heads 1414 connected to the charger 1424. The charging interface module 1408 is configured to communicate with the chargers 1424, using the OCPP, for example. The chargers 1424 are configured to transmit information to, and receive information from, the EVs 1416.

The information from the instruction processing unit 1402 to the chargers 1424, through the charging interface module 1408, may include queries regarding vehicle identification, preferred charging voltage and current mode (AC or DC), queries regarding charging capacities of batteries in the EVs 1416, percentages of the charging capacities presently attained, or charging current limits, reformatted at each stage for compatibility with the receiving component. The information from the chargers 1424 to the instruction processing unit 1402, through the charging interface module 1408, may include responses to the queries, also reformatted at each stage.

The controller 1400 is configured to operate the EV charging equipment 1410 to direct charging current to the EVs 1416. The instruction processing unit 1402 is configured to transmit information to the charging interface module 1408 designed to cause the EV charging equipment 1410 to direct charging current to the EVs 1416, one at a time. The charging interface module 1408 is configured to receive the information from the instruction processing unit 1402 and transmit information to the chargers 1424, designed to cause a selected charger 1424 to direct charging current to flow from the power source 1418 through a selected charging head 1414 to the selected EV 1416. In this example, the information from the charging interface module 1408 to the chargers 1424, designed to direct charging current to the selected EV 1416, may include an ON instruction and an identification of the selected charging head 1414 to the selected charger 1424, and an OFF instruction to the remaining chargers 1424. The instruction processing unit 1402 is further configured to transmit information to the charging interface module 1408 designed to cause the chargers 1424 to stop the charging current to the EV 1416 being charged, prior to directing charging current to another EV 1416. The controller 1400 and the chargers 1424 may be configured to charge the EVs 1416 according to any of the example charging schemes disclosed in reference to FIG. 2, FIG. 3, and FIG. 5 through FIG. 10.

The example EV charging configuration of FIG. 14 may advantageously enable efficient charging of the EVs 1416 using the EVSE stations 1424, without operator intervention. Using the EVSE stations 1424 with the multiple charging heads 1414 may enable more lower capital costs than charging facilities with EVSE stations having single charging heads.

Figure 15:
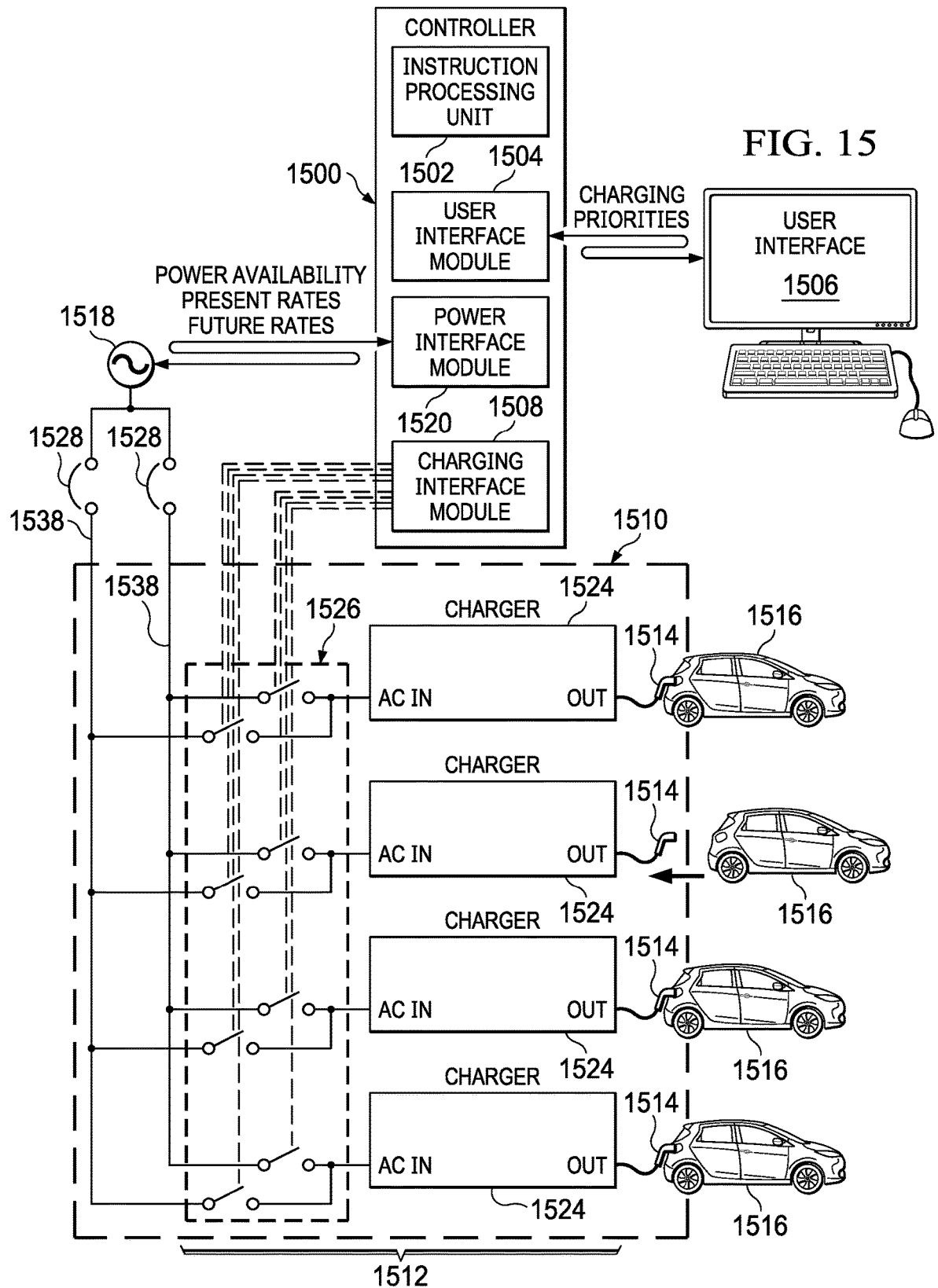
FIG. 15 is a schematic diagram of an example EV charging configuration having a controller, EV charging equipment with elementary chargers connected to a plurality of utility power circuits, and EVs.

FIG. 15 is a schematic diagram of an example EV charging configuration having a controller, EV charging equipment with elementary chargers connected to a plurality of utility power circuits, and EVs. The controller 1500 includes an instruction processing unit 1502, a user interface module 1504 coupled to a user interface 1506, and a charging interface module 1508 coupled to EV charging equipment 1510. The instruction processing unit 1502 is configured to transmit information to the user interface module 1504, and to receive information from the user interface module 1504. The instruction processing unit 1502 is configured to transmit information to the charging interface module 1508; the instruction processing unit 1502 may optionally be configured to receive information from the charging interface module 1508.

In this example, the EV charging equipment 1510 includes chargers 1524, power relays 1526, and charging heads 1514. The chargers 1524 combined with the power relays 1526 provide a power management apparatus 1512. The power relays 1526 couple a power source 1518 having a plurality of independent utility power circuits 1538 to the chargers 1524. The power source 1518 may be an AC power source from a utility provider. Each utility power circuit 1538 may be coupled to the power relays 1526 through a dedicated current limiting component 1528, such as a conventional circuit breaker or a smart circuit breaker, as indicated in FIG. 15. Each of the chargers 1524 is coupled to each of the utility power circuits 1538 through separate instances of the power relays 1526.

In this example, the controller 1500 may include a power interface module 1520 configured to receive information from the power source 1518 and transmit information to the power source 1518. The instruction processing unit 1502 is configured to transmit information to the power interface module 1520 and to receive information from the power interface module 1520. The instruction processing unit 1502, the power interface module 1520 and the power source 1518 are configured to exchange information, for example as disclosed in reference to the instruction processing unit 1102, the power interface module 1120, and the power source 1118 of FIG. 11.

The chargers 1524 of this example may be implemented as elementary chargers, as described in reference to the elementary chargers 1124 of FIG. 11. The charging heads 1514 are connected to EVs 1516. The charging heads 1514 may be implemented as any of the examples disclosed in reference to the charging heads 1114 of FIG. 11.

The controller 1500 is configured to operate the EV charging equipment 1510 to direct charging current to the EVs 1516. In this example, the instruction processing unit 1502 is configured to transmit information to the charging interface module 1508 designed to cause the EV charging equipment 1510 to concurrently direct charging current to as many of the EVs 1516 as there are utility power circuits 1538 available, in which each EV 1516 of the subset is connected to a separate instance of the available utility power circuits 1538 through one of the power relays 1526 and corresponding charger 1524. Availability of the utility power circuits 1538 may be affected by total current limitations, for example.

The charging interface module 1508 is configured to receive the information from the instruction processing unit 1502 and transmit information to the EV charging equipment 1510 designed to cause a separate instance of the power relays 1526 connected to each of the available utility power circuits 1538 to close, concurrently. As a result, charging current flows from the power source 1518 through the corresponding utility power circuit 1538 and the closed relay 1526, through the charger 1524 connected to the closed relay 1526, through the corresponding charging head 1514 to the corresponding EV 1516. In this example, the information from the charging interface module 1508 to the EV charging equipment 1510, designed to cause one of the power relays 1526 to close, may include an ON signal to the power relay 1526 to be closed.

The instruction processing unit 1502 is further configured to transmit information to the charging interface module 1508 designed to cause the EV charging equipment 1510 to stop the charging current to the EV 1516 being charged, prior to directing charging current to another EV 1516. The controller 1500 and the EV charging equipment 1510 may be configured to charge the EVs 1516 according to any of the example charging schemes disclosed in reference to FIG. 2, FIG. 3, and FIG. 5 through FIG. 10, with the example charging schemes applied concurrently to each of the utility power circuits 1538.

The example EV charging configuration of FIG. 15 may advantageously enable efficient charging of the EVs 1516 using the elementary chargers 1524, without operator intervention. Using the elementary chargers 1524 combined with the power relays 1526 connected to the plurality of utility power circuits 1538 may accrue the advantages disclosed in reference to FIG. 11, for large numbers of the EVs 1516 which cannot be charged in a desired time period on a single utility power circuit.

Figure 16:
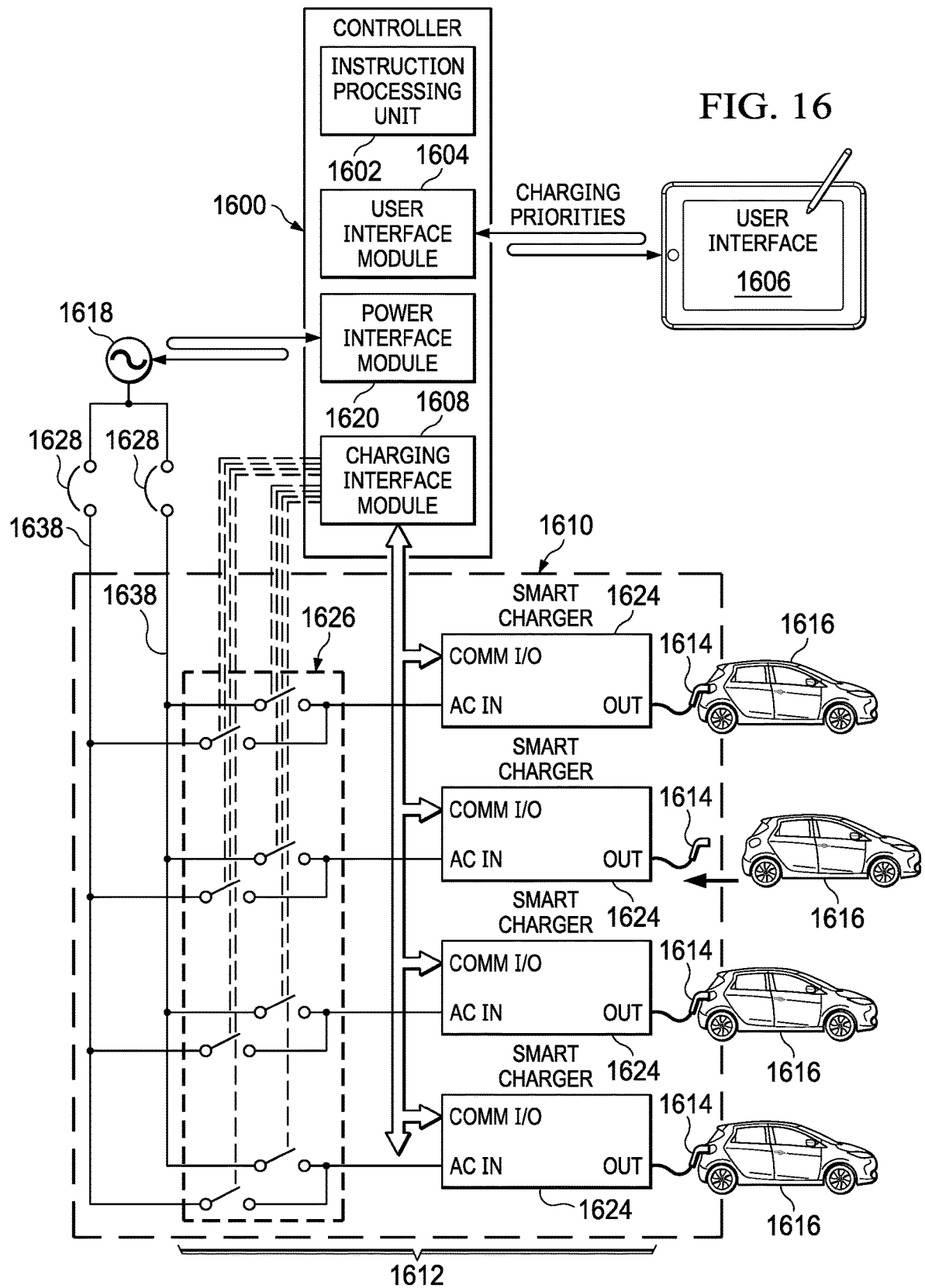
FIG. 16 is a schematic diagram of an example EV charging configuration having a controller, EV charging equipment with EVSE stations connected to a plurality of utility power circuits, and EVs.

FIG. 16 is a schematic diagram of an example EV charging configuration having a controller, EV charging equipment with EVSE stations connected to a plurality of utility power circuits, and EVs. The controller 1600 includes an instruction processing unit 1602, a user interface module 1604 coupled to a user interface 1606, and a charging interface module 1608 coupled to EV charging equipment 1610. The instruction processing unit 1602 is configured to transmit information to the user interface module 1604, and to receive information from the user interface module 1604. The instruction processing unit 1602 is configured to transmit information to the charging interface module 1608; the instruction processing unit 1602 may optionally be configured to receive information from the charging interface module 1608.

In this example, the EV charging equipment 1610 includes chargers 1624, power relays 1626, and charging heads 1614. The chargers 1624 combined with the power relays 1626 provide a power management apparatus 1612. The power relays 1626 couple a power source 1618 having a plurality of independent utility power circuits 1638 to the chargers 1624. The power source 1618 may be an AC power source from a utility provider. Each utility power circuit 1638 may be coupled to the power relays 1626 through a dedicated current limiting component 1628, such as a conventional circuit breaker or a smart circuit breaker, as indicated in FIG. 16. Each of the chargers 1624 is coupled to each of the utility power circuits 1638 through separate instances of the power relays 1626.

In this example, the controller 1600 may include a power interface module 1620 configured to receive information from the power source 1618 and transmit information to the power source 1618. The instruction processing unit 1602 is configured to transmit information to the power interface module 1620 and to receive information from the power interface module 1620. The instruction processing unit 1602, the power interface module 1620 and the power source 1618 are configured to exchange information, for example as disclosed in reference to the instruction processing unit 1102, the power interface module 1120, and the power source 1118 of FIG. 11.

The chargers 1624 of this example may be implemented as EVSE stations, as described in reference to the EVSE stations 1224 of FIG. 12. The charging heads 1614 are connected to EVs 1616. The charging heads 1614 may be implemented as any of the examples disclosed in reference to the charging heads 1114 of FIG. 11.

The controller 1600 is configured to operate the EV charging equipment 1610 to direct charging current to the EVs 1616. In this example, the instruction processing unit 1602 is configured to transmit information to the charging interface module 1608 designed to cause the EV charging equipment 1610 to concurrently direct charging current to as many of the EVs 1616 as there are utility power circuits 1638 available, in which each EV 1616 of the subset is connected to a separate instance of the available utility power circuits 1638 through one of the power relays 1626 and corresponding chargers 1624.

The charging interface module 1608 is configured to receive the information from the instruction processing unit 1602 and transmit information to the EV charging equipment 1610 designed to cause a separate instance of the power relays 1626 connected to each of the available utility power circuits 1638 to close, concurrently. As a result, charging current flows from the power source 1618 through the corresponding utility power circuit 1638 and the closed relay 1626, through the charger 1624 connected to the closed relay 1626, through the corresponding charging head 1614 to the corresponding EV 1616. In this example, the information from the charging interface module 1608 to the EV charging equipment 1610, designed to cause one of the power relays 1626 to close, may include an ON signal to the power relay 1626 to be closed and may include an ON instruction to a selected charger 1624 connected to the power relay 1626 to be closed.

The instruction processing unit 1602 is further configured to transmit information to the charging interface module 1608 designed to cause the EV charging equipment 1610 to stop the charging current to the EV 1616 being charged, prior to directing charging current to another EV 1616. In this example, to stop the charging current, charging interface module 1608 may transmit information to the EV charging equipment 1610, including an OFF signal to the power relay 1626 that is closed and an OFF instruction to the selected charger 1624 connected to the power relay 1626 that is closed.

The controller 1600 and the EV charging equipment 1610 may be configured to charge the EVs 1616 according to any of the example charging schemes disclosed in reference to FIG. 2, FIG. 3, and FIG. 5 through FIG. 10, with the example charging schemes applied concurrently to each of the utility power circuits 1638.

The example EV charging configuration of FIG. 16 may advantageously enable efficient charging of the EVs 1616 using the elementary chargers 1624, without operator intervention. Using the EVSE stations 1624 combined with the power relays 1626 connected to the plurality of utility power circuits 1638 may accrue the advantages disclosed in reference to FIG. 12, for large numbers of the EVs 1616 which cannot be charged in a desired time period on a single utility power circuit.

Figure 17:
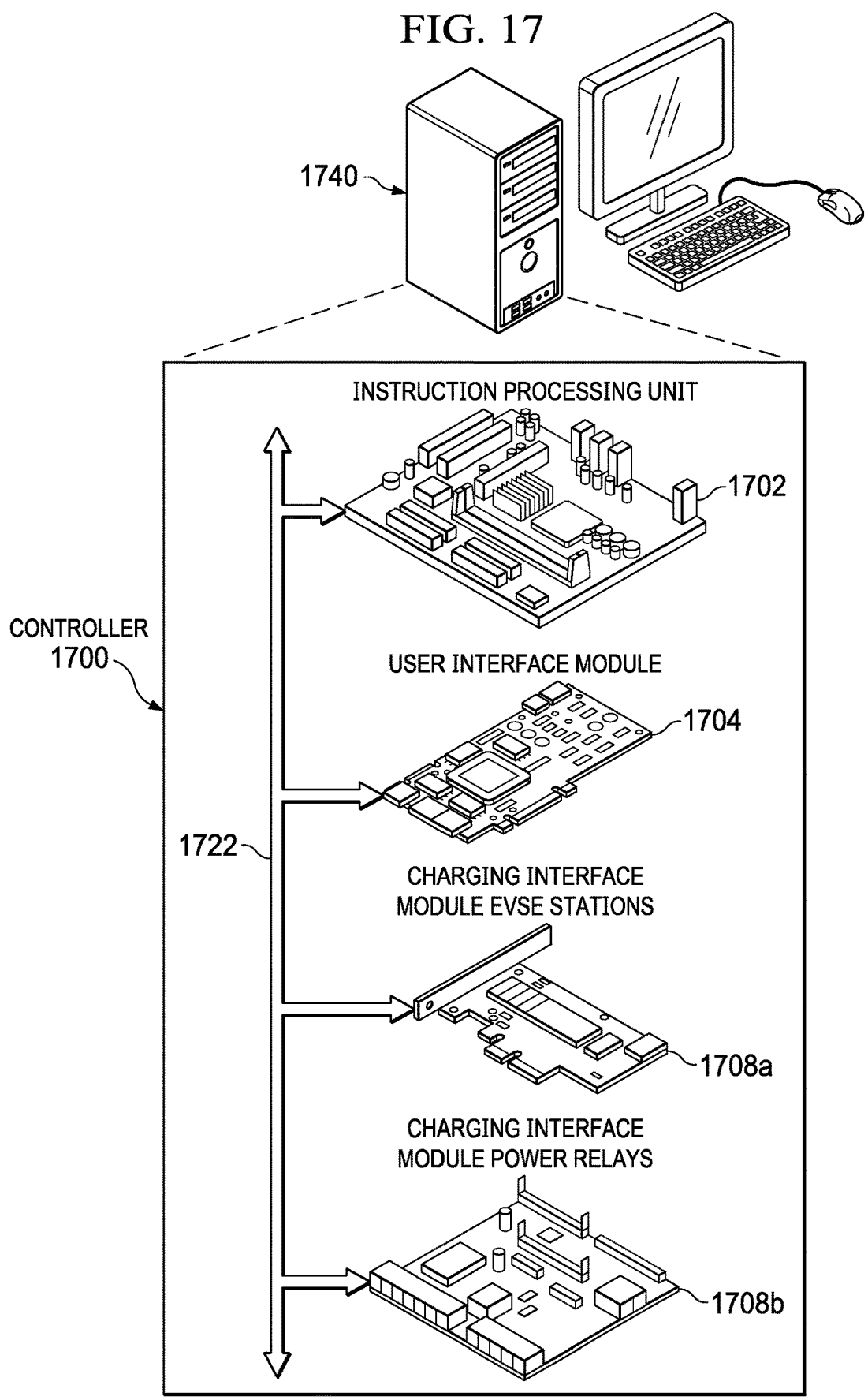
FIG. 17 depicts an example consolidated configuration of a controller for managing charging of EVs according to any of the example charging schemes disclosed.

FIG. 17 depicts an example consolidated configuration of a controller for managing charging of EVs according to any of the example charging schemes disclosed in reference to FIG. 2, FIG. 3, and FIG. 5 through FIG. 10. The controller 1700 includes an instruction processing unit 1702, configured to function as disclosed in reference to any of the instruction processing units 102, and 1102 through 1602 of FIG. 1, and FIG. 11 through FIG. 16, respectively. In this example, the controller 1700 may be implemented as a central processing unit (CPU) and memory of a computer, with code, readable by the CPU, to execute the example charging schemes stored in the memory.

The controller 1700 includes a user interface module 1704. The user interface module 1704 is coupled to a user interface, not shown in FIG. 17. The user interface module 1704 is configured to transmit and receive information. The user interface module 1704 is configured to function as disclosed in reference to any of the user interface modules 104, and 1104 through 1604 of FIG. 1, and FIG. 11 through FIG. 16, respectively. In this example, the user interface module 1704 may be implemented as a combination of a graphics processing unit (GPU), a keyboard interface module, and a mouse interface module of the computer.

The controller 1700 includes a first charging interface module 1708a for EVSE stations or a second charging interface module 1708b for relays. The first charging interface module 1708a is coupled to EVSE stations of the EV charging equipment, not shown in FIG. 17. The second charging interface module 1708b is coupled to power relays connected to elementary chargers of the EV charging equipment. The instruction processing unit 1702 is configured to transmit information to the charging interface module 1708a or 1708b and to receive information from the charging interface module 1708a or 1708b. In this example, the first charging interface module 1708a may be implemented as a network interface card, sometimes referred to as a local area network (LAN) adapter, of the computer. The second charging interface module 1708b may be implemented as an input/output (I/O) relay board of the computer.

The instruction processing unit 1702, the user interface module 1704, and the charging interface module 1708a or 1708b may be contained in a controller enclosure 1740 such as a computer case. The instruction processing unit 1702, the user interface module 1704, and the charging interface module 1708a or 1708b may communicate with each other through a data bus 1722 of the computer, which may advantageously provide reliable communication compared to wireless or cabled communication. Having the parts of the controller 1700 consolidated in the controller enclosure 1740 may advantageously facilitate maintenance of the controller 1700. Having the parts of the controller 1700 consolidated in the controller enclosure 1740 may advantageously facilitate portability and relocation of the controller 1700.

FIG. 18 depicts an example distributed configuration of a controller for managing charging of EVs according to any of the example charging schemes disclosed in reference to FIG. 2, FIG. 3, and FIG. 5 through FIG. 10. The controller 1800 includes an instruction processing unit 1802, configured to function as disclosed in reference to any of the instruction processing units 102, and 1102 through 1602 of FIG. 1, and FIG. 11 through FIG. 16, respectively. In this example, the instruction processing unit 1802 may be implemented as an industrial microcontroller interfaced to a network such as the internet or a local network, by a wireless connection. Alternatively, in this example, the instruction processing unit 1802 may be implemented as a remote processor or server, for example provided by a web service, interfaced to the internet.

The controller 1800 includes a user interface module 1804. The user interface module 1804 is coupled to a user interface, not shown in FIG. 18. The user interface module 1804 is configured to transmit and receive information. The user interface module 1804 is configured to function as disclosed in reference to any of the user interface modules 104, and 1104 through 1604 of FIG. 1, and FIG. 11 through FIG. 16, respectively. In this example, the user interface module 1804 may be implemented as one or more user interface appliances, such as laptop computers, spatially dispersed, and interfaced to the instruction processing unit 1802 through the internet or the local network by a wireless connection. The user interface appliances may include the user interface, with software to support the user interface stored in the laptop computer memory. Having more than one user interface appliance for the user interface module 1804 may advantageously provide more flexibility for user inputs.

The controller 1800 includes one or more first charging interface modules 1808a for EVSE stations or second charging interface modules 1808b for relays. The first charging interface modules 1808a are coupled to EVSE stations of the EV charging equipment, not shown in FIG. 18. The second charging interface module 1808b are coupled to power relays connected to elementary chargers of the EV charging equipment. The instruction processing unit 1802 is configured to transmit information to the charging interface modules 1808a or 1808b and to receive information from the charging interface modules 1808a or 1808b. In this example, the first charging interface modules 1808a may be implemented as OCPP pile end controller modules located proximate to the charging equipment, and may interface to the instruction processing unit 1802 through the internet or the local network. The second charging interface modules 1808b may be implemented as wireless high power relay controller, and may interface to the instruction processing unit 1802 through a local wireless network such as WiFi.

The instruction processing unit 1802, the user interface module 1804, and the charging interface module 1808a or 1808b may be spatially distributed, that is, not contained in a single enclosure or piece of equipment, to be proximate to the equipment to which they are interfaced. In particular, the controller 1800 may have multiple instances of the charging interface module 1808a or 1808b distributed among EV charging locations, advantageously reducing costs of installing the controller 1800. The controller 1800 may have two or more instances of the user interface module 1804 with corresponding user interfaces, advantageously allowing user inputs from more than one location.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:

1. An electric vehicle charging master controller, comprising:
   an instruction processing unit that transmits information and receives information;
   a user interface module that receives information from the instruction processing unit and transmits information to the instruction processing unit; and
   a charging interface module, separate from the instruction processing unit, that receives information from the instruction processing unit and transmits information to an electric vehicle charging equipment that is external to the electric vehicle charging master controller;
   wherein:
   the instruction processing unit transmits a first set of information to the charging interface module that causes the electric vehicle charging equipment to direct a first charging current to a first electric vehicle of a plurality of electric vehicles concurrently coupled to the electric vehicle charging equipment;
   the charging interface module formats the first set of information to be compatible with the EV charging equipment and transmits the formatted first set of information to the EV charging equipment;
   the instruction processing unit transmits a second set of information to the charging interface module that causes the electric vehicle charging equipment to stop the first charging current to the first electric vehicle when a first charging cessation criterion has been met;
   the charging interface module formats the second set of information to be compatible with the EV charging equipment and transmits the formatted second set of information to the EV charging equipment;
   the instruction processing unit transmits a third set of information to the charging interface module designed to cause that causes the electric vehicle charging equipment to direct a second charging current to a second electric vehicle of the plurality of electric vehicles;
   the charging interface module formats the third set of information to be compatible with the EV charging equipment and transmits the formatted third set of information to the EV charging equipment;
   the instruction processing unit transmits a fourth set of information to the charging interface module that causes the electric vehicle charging equipment to stop the second charging current to the second electric vehicle when a second charging cessation criterion has been met; and
   the charging interface module formats the fourth set of information to be compatible with the EV charging equipment and transmits the formatted fourth set of information to the EV charging equipment.

2. The electric vehicle charging master controller of claim 1, wherein the first charging cessation criterion is selected from the group consisting of expiration of a prescribed charging time period and the first electric vehicle is sufficiently charged.

3. The electric vehicle charging master controller of claim 1, wherein the electric vehicle charging master controller directs charging current sequentially to each of the plurality of electric vehicles, including at least the first electric vehicle and the second electric vehicle, one at a time, repeatedly.

4. The electric vehicle charging master controller of claim 1, wherein the electric vehicle charging master controller directs charging current sequentially to each of the plurality of electric vehicles, including at least the first electric vehicle and the second electric vehicle, during periods when an electric power rate is below a threshold rate, one at a time, repeatedly.

5. The electric vehicle charging master controller of claim 1, wherein the electric vehicle charging master controller directs charging current sequentially to each of the plurality of electric vehicles, including at least the first electric vehicle and the second electric vehicle, during time periods when an electric power rate is below a threshold rate, one at a time, repeatedly, and directs charging current sequentially to electric vehicles having high priority status of the plurality of electric vehicles, regardless of the electric power rates.

6. The electric vehicle charging master controller of claim 1, wherein the electric vehicle charging master controller directs charging current sequentially to each of the plurality of electric vehicles, including at least the first electric vehicle and the second electric vehicle, one at a time, repeatedly, and directs charging current to electric vehicles of the plurality of electric vehicles having high priority status more frequently than remaining electric vehicles of the plurality of electric vehicles.

7. The electric vehicle charging master controller of claim 1, wherein the electric vehicle charging master controller directs charging current sequentially to each of the plurality of electric vehicles, including at least the first electric vehicle and the second electric vehicle, one at a time, repeatedly, and directs charging current to electric vehicles of the plurality of electric vehicles having high priority status for longer prescribed time periods than remaining electric vehicles of the plurality of electric vehicles.

8. The electric vehicle charging master controller of claim 1, wherein the electric vehicle charging master controller directs charging current sequentially to each of the plurality of electric vehicles, including at least the first electric vehicle and the second electric vehicle, one at a time, repeatedly, and directs charging current to electric vehicles of the plurality of electric vehicles having low priority status less frequently than remaining electric vehicles of the plurality of electric vehicles.

9. The electric vehicle charging master controller of claim 1, wherein the electric vehicle charging master controller directs charging current sequentially to each of the plurality of electric vehicles, including at least the first electric vehicle and the second electric vehicle, one at a time, repeatedly, and directs charging current to electric vehicles of the plurality of electric vehicles having low priority status for shorter prescribed time periods than remaining electric vehicles of the plurality of electric vehicles.

10. The electric vehicle charging master controller of claim 1, wherein:
   the electric vehicle charging equipment includes elementary chargers coupled to a power source through power relays, and charging heads;
   the charging interface module is configured to receive the first set of information from the instruction processing unit and transmit the formatted first set of information to the electric vehicle charging equipment designed to cause one of the power relays to close at a time, enabling charging current to flow from the power source through the power relay that was closed, through the charger connected to the relay that was closed, through a corresponding charging head to the first electric vehicle; and
   the charging interface module is configured to receive the second set of information from the instruction processing unit and transmit the formatted second set of information to the electric vehicle charging equipment designed to cause the power relay that was closed to be opened, to stop the charging current to the first electric vehicle.

11. The electric vehicle charging master controller of claim 1, wherein:
the electric vehicle charging equipment includes electric vehicle service equipment (EVSE) stations coupled to a power source, and charging heads;
the charging interface module is configured to receive the first set of information from the instruction processing unit and transmit the formatted first set of information to an instance of the EVSE stations coupled to the first electric vehicle designed to cause charging current to flow from the power source through the EVSE station coupled to the first electric vehicle, through a corresponding charging head to the first electric vehicle; and
the charging interface module is configured to receive the second set of information from the instruction processing unit and transmit the formatted second set of information to the EVSE station coupled to the first electric vehicle designed to stop the charging current to the first electric vehicle.

12. The electric vehicle charging master controller of claim 1, wherein:
the electric vehicle charging equipment includes a single charger, selected from the group consisting of an EVSE station and an elementary charger, coupled to a power source and connected to a charging head multiplexer, and charging heads connected to the charging head multiplexer;
the charging interface module is configured to transmit information to the single charger designed to cause charging current to flow from the power source through the single charger to the charging head multiplexer, and transmit information to the charging head multiplexer designed to cause the charging head multiplexer to connect the single charger to the first electric vehicle; and
the charging interface module is configured to transmit information to the single charger designed to stop the charging current to the first electric vehicle.

13. The electric vehicle charging master controller of claim 12, wherein the charging head multiplexer includes charging cable relays connecting the charging heads to the single charger.

14. The electric vehicle charging master controller of claim 1, wherein:
the electric vehicle charging equipment includes EVSE stations coupled to a power source, wherein each EVSE station has a plurality of charging heads, wherein a first EVSE station of the EVSE stations is connected to the first electric vehicle through a first charging head;
the charging interface module is configured to receive the first set of information from the instruction processing unit and transmit the formatted first set of information to the first EVSE station designed to cause charging current to flow from the power source through the first EVSE station, through the first charging head, to the first electric vehicle; and
the charging interface module is configured to receive the second set of information from the instruction processing unit and transmit the formatted second set of information to the first EVSE station designed to stop the charging current to the first electric vehicle.

15. The electric vehicle charging master controller of claim 1, wherein:
the electric vehicle charging equipment includes elementary chargers, each of the elementary chargers being coupled to a first power source circuit through first power relays, and coupled to a second power source circuit through second power relays, with charging heads connected to the elementary chargers, wherein a first elementary charger of the elementary chargers is connected to the first electric vehicle through a first charging head;
the charging interface module is configured to receive the first set of information from the instruction processing unit and transmit the formatted first set of information to the electric vehicle charging equipment designed to cause one of the power relays to close at a time, enabling charging current to flow from the first power source circuit through the power relay that was closed, through the first elementary charger, through the first charging head, to the first electric vehicle; and
the charging interface module is configured to receive the second set of information from the instruction processing unit and transmit the formatted second set of information to the electric vehicle charging equipment designed to cause the power relay that was closed to be opened, to stop the charging current to the first electric vehicle.

16. The electric vehicle charging master controller of claim 1, wherein:
the electric vehicle charging equipment includes EVSE stations, each of the EVSE stations being coupled to a first power source circuit through first power relays, and coupled to a second power source circuit through second power relays, with charging heads connected to the EVSE stations, wherein a first EVSE station of the EVSE stations is connected to the first electric vehicle through a first charging head;
the charging interface module is configured to receive the first set of information from the instruction processing unit and transmit the formatted first set of information to the electric vehicle charging equipment designed to cause one of the power relays to close at a time, enabling charging current to flow from the first power source circuit through the power relay that was closed, through the first EVSE station, through the first charging head, to the first electric vehicle; and
the charging interface module is configured to receive the second set of information from the instruction processing unit and transmit the formatted second set of information to the electric vehicle charging equipment designed to cause the power relay that was closed to be opened, to stop the charging current to the first electric vehicle.

17. The electric vehicle charging master controller of claim 1, wherein:
the electric vehicle charging master controller has a consolidated configuration wherein the instruction processing unit, the user interface module, and the charging interface module are contained in a controller enclosure;
the electric vehicle charging master controller is implemented as a central processing unit (CPU) and memory of a computer, with code, readable by the CPU;
the user interface module is implemented as a combination of a graphics processing unit (GPU), a keyboard interface module, and a mouse interface module of the computer;

the charging interface module is selected from the group consisting of a network interface card of the computer and an input/output (I/O) relay board of the computer; and the instruction processing unit, the user interface module, and the charging interface module communicate with each other through a data bus of the computer.

18. The electric vehicle charging master controller of claim 1, wherein:

the electric vehicle charging master controller has a distributed configuration wherein the instruction processing unit, the user interface module, and the charging interface module are spatially distributed, that is, not contained in a single enclosure;

the instruction processing unit is implemented as an industrial microcontroller interfaced to a network by a first wireless connection;

the user interface module is implemented as a laptop computer interfaced to the instruction processing unit through the network by a second wireless connection; and the charging interface module is selected from the group consisting of an Open Charge Point Protocol (OCPP) pile end controller module and a wireless high power relay controller, interfaced to the instruction processing unit through the network by a third wireless connection.

19. The electric vehicle charging master controller of claim 1, wherein:

the user interface module includes two user interface appliances interfaced to the instruction processing unit.

20. A method of charging electric vehicles, comprising:

transmitting a first set of information from an instruction processing unit to a charging interface module, separate from the instruction processing unit, designed to cause an electric vehicle charging equipment to direct a first charging current to a first electric vehicle of a plurality of electric vehicles concurrently coupled to the electric vehicle charging equipment;

formatting the first set of information in the charging interface module to be compatible with the electric vehicle charging equipment and transmitting the formatted first set of information to the electric vehicle charging equipment;

transmitting a second set of information from the instruction processing unit to the charging interface module designed to cause the electric vehicle charging equipment to stop the first charging current to the first electric vehicle when a first charging cessation criterion has been met;

formatting the second set of information in the charging interface module to be compatible with the electric vehicle charging equipment and transmitting the formatted second set of information to the electric vehicle charging equipment;

transmitting a third set of information from the instruction processing unit to the charging interface module designed to cause the electric vehicle charging equipment to direct a second charging current to a second electric vehicle of the plurality of electric vehicles;

formatting the third set of information in the charging interface module to be compatible with the electric vehicle charging equipment and transmitting the formatted third set of information to the electric vehicle charging equipment;

transmitting a fourth set of information from the instruction processing unit to the charging interface module designed to cause the electric vehicle charging equipment to stop the second charging current to the second electric vehicle when a second charging cessation criterion has been met; and formatting the fourth set of information in the charging interface module to be compatible with the electric vehicle charging equipment and transmitting the formatted fourth set of information to the electric vehicle charging equipment.

\* \* \* \* \*